US009923512B2

(12) United States Patent
Martin

(10) Patent No.: US 9,923,512 B2
(45) Date of Patent: Mar. 20, 2018

(54) CLAMPS FOR FRAMELESS SOLAR MODULES

(71) Applicant: Hubbell Incorporated, Shelton, CT (US)

(72) Inventor: Evan Ronald Martin, Merrimack, NH (US)

(73) Assignee: HUBBELL INCORPORATED, Shelton, CT (US)

(*) Notice: Subject to any disclaimer, the term of this patent is extended or adjusted under 35 U.S.C. 154(b) by 0 days.

(21) Appl. No.: 15/399,412

(22) Filed: Jan. 5, 2017

(65) Prior Publication Data

US 2017/0194896 A1    Jul. 6, 2017

Related U.S. Application Data

(60) Provisional application No. 62/275,274, filed on Jan. 6, 2016.

(51) Int. Cl.

| H01R 13/60 | (2006.01) |
| H01R 13/66 | (2006.01) |
| H01L 31/042 | (2014.01) |
| H02S 30/10 | (2014.01) |
| F16B 2/06 | (2006.01) |
| H02S 40/36 | (2014.01) |

(52) U.S. Cl.
CPC .............. *H02S 30/10* (2014.12); *F16B 2/065* (2013.01); *H02S 40/36* (2014.12)

(58) Field of Classification Search
CPC .......... H01R 13/73; H01R 12/52; H01R 9/096
USPC .......... 439/574–575, 65; 136/244, 291, 251; 248/316.7, 500, 680
See application file for complete search history.

(56) References Cited

U.S. PATENT DOCUMENTS

| 6,360,491 B1 | 3/2002 | Ullman | |
| 6,672,018 B2* | 1/2004 | Shingleton | F24J 2/5205 126/621 |
| 9,003,726 B2* | 4/2015 | Sader | F24J 2/5245 136/251 |
| 9,068,764 B2 | 6/2015 | Moore et al. | |
| 9,106,023 B2* | 8/2015 | Schaefer | F24J 2/5245 |
| 9,220,342 B2* | 12/2015 | Byrne | A47B 97/00 |
| 2010/0193012 A1 | 8/2010 | Klammer et al. | |

(Continued)

FOREIGN PATENT DOCUMENTS

| WO | 2010112049 A1 | 7/2010 |
| WO | 2012143811 A2 | 10/2012 |

OTHER PUBLICATIONS

PD-5-321-168; First Solar FS Series 4 Module Clip Compatibility; Apr. 20, 2015, 1 page.

(Continued)

*Primary Examiner* — Abdullah Riyami
*Assistant Examiner* — Thang Nguyen
(74) *Attorney, Agent, or Firm* — Wissing Miller LLP

(57) ABSTRACT

The present disclosure provides clamps used to assemble photovoltaic (PV) arrays with frameless PV modules. The clamp includes a clamp cover configured to fit within a clamp grip such that when the clamp cover is fitted to the clamp grip pockets are formed to receive portions of PV modules. A base of the clamp cover may include one or more legs that act as a stop to prevent over tightening the clamp.

31 Claims, 24 Drawing Sheets

(56) References Cited

U.S. PATENT DOCUMENTS

| | | | | |
|---|---|---|---|---|
| 2013/0193297 A1* | 8/2013 | Hartelius | ............... | F24J 2/5232 |
| | | | | 248/500 |
| 2013/0200234 A1 | 8/2013 | Zhao et al. | | |
| 2014/0361135 A1* | 12/2014 | Moore | ................... | H02S 20/00 |
| | | | | 248/316.7 |
| 2015/0092383 A1* | 4/2015 | Corio | ...................... | H02S 20/10 |
| | | | | 361/807 |

OTHER PUBLICATIONS

PD-5-321-102; First Solar FS Series Module Clip Compatibility; May 12, 2011, 1 page.
PD-5-321-174 6/; First Solar FS Series 4 Module Clip Compatibility; Jun. 30, 2015, 1 page.
International Search Report and Written Opinion mailed in corresponding application PCT/US2017/012333 dated Mar. 4, 2017, 7 pages.

\* cited by examiner

CLAMPS FOR FRAMELESS SOLAR MODULES

CROSS REFERENCE TO RELATED APPLICATIONS

The present disclosure is based on and claims benefit from co-pending U.S. Provisional Application Ser. No. 62/275,274 filed Jan. 6, 2016 entitled "Clamps for Frameless Solar Modules" the entire contents of which are herein incorporated by reference.

BACKGROUND

Field

The present disclosure relates generally to clamps for assembling solar arrays, and more particularly to mid-clamps used to secure frameless photovoltaic modules to rail systems.

Description of the Related Art

Photovoltaic arrays are typically composed of a number of photovoltaic modules set within a metallic frame, and a rail system that supports the photovoltaic modules. When installing a photovoltaic array, a number of photovoltaic modules are assembled onto the rail system, which is sometimes called rails or racking structures. The metallic frames of the individual photovoltaic modules, and the structural pieces, e.g., the rails, on which the modules mount are generally made out of aluminum, which is typically anodized to resist corrosion.

One obstacle to the general adoption of solar energy for power generation is the cost to fabricate and install photovoltaic arrays. The metallic frames supporting the photovoltaic modules are a contributor to the higher costs of using solar energy for power generation. Recently, frameless photovoltaic modules, e.g., thin-film and crystalline photovoltaic modules, have been developed. Frameless photovoltaic modules eliminate the metal framing supporting the photovoltaic modules, which reduces the manufacturing costs to build the photovoltaic modules and thus the photovoltaic arrays. Further, the metal framing supporting the photovoltaic modules has been found to be less aesthetic pleasing than frameless photovoltaic modules.

SUMMARY

The present disclosure provides descriptions of embodiments for clamps used to assemble photovoltaic (PV) arrays with frameless PV modules. In one exemplary embodiment, the clamp includes a clamp cover and a clamp grip. The clamp cover includes a base, first and second side walls extending from the base and forming a channel, a first clamp arm extending from the first side wall, and a second clamp arm extending from the second side wall. The clamp cover base may also include at least one leg extending from a bottom surface of the base. The clamp grip has a base, and first and second side walls extending from the base and forming a channel to receive the clamp cover channel. The first side wall includes an upper wall, a lower wall and a notch between the upper and lower walls. The notch defines a bending point for the first side wall. The second side wall includes an upper wall, a lower wall and a notch between the upper and lower walls. The notch defines a bending point for the second side wall. In such an embodiment, when the clamp cover channel is inserted into the clamp grip channel the first clamp arm engages the upper wall of the first side wall of the clamp grip such that the upper wall of the first side wall of the clamp grip bends at the bending point away from the clamp grip channel to form a pocket to receive at least a portion of a frameless PV module. In addition, when the clamp cover channel is inserted into the clamp grip channel the second clamp arm engages the upper wall of the second side wall of the clamp grip, such that the upper wall of the second side wall of the clamp grip bends at the bending point away from the clamp grip channel to form a pocket to receive at least a portion of a frameless PV module.

In another exemplary embodiment, the clamp according to the present disclosure includes a clamp cover and a clamp grip. The clamp cover includes a base, first and second side walls extending from the base and forming a channel, a first clamp arm extending from the first side wall, and a second clamp arm extending from the second side wall. The base may also include at least one leg extending from an end of the base. The clamp grip has base, a first side wall extending from the base and a second side wall extending from the base forming a channel to receive the clamp cover channel. The first side wall includes an upper wall, a lower wall and a notch between the upper and lower walls. The notch defines a bending point for the first side wall. The second side wall includes an upper wall, a lower wall and a notch between the upper and lower walls. The notch defines a bending point for the second side wall. In such an embodiment, when the clamp cover channel is inserted into the clamp grip channel the first clamp arm engages the upper wall of the first side wall of the clamp grip, such that the upper wall of the first side wall of the clamp grip bends at the bending point away from the clamp grip channel to form a pocket to receive at least a portion of a frameless PV module. In addition, when the clamp cover channel is inserted into the clamp grip channel the second clamp arm engages the upper wall of the second side wall of the clamp grip, such that the upper wall of the second side wall of the clamp grip bends at the bending point away from the clamp grip channel to form a pocket to receive at least a portion of a frameless PV module.

In another exemplary embodiment, the clamp according to the present disclosure includes a clamp cover and a clamp grip. The clamp cover includes a clamp arm and first and second side walls extending from the clamp arm. The clamp arm has a first clamp arm portion and a second clamp arm portion. The clamp grip has a base and first and second side walls extending from the base forming a channel to receive the first and second clamp cover side walls. The first clamp grip side wall includes an upper wall, a lower wall and a notch between the upper and lower walls. The notch defines a bending point for the first clamp grip side wall. The second clamp grip side wall includes an upper wall, a lower wall and a notch between the upper and lower walls. The notch defines a bending point for the second clamp grip side wall. In such an embodiment, when the clamp cover side walls are inserted into the clamp grip channel, the first clamp arm portion engages the upper wall of the first clamp grip side wall, such that the upper wall of the first clamp grip side wall bends at the bending point away from the clamp grip channel to form a pocket to receive at least a portion of a frameless PV module. In addition, when the clamp cover side walls are inserted into the clamp grip channel, the second clamp arm portion engages the upper wall of the second clamp grip side wall such that the upper wall of the second clamp grip side wall bends at the bending point away from the clamp grip channel to form a pocket to receive at least a portion of a frameless PV module.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein.

DETAILED DESCRIPTION

The present disclosure provides descriptions of embodiments for clamps used to assemble photovoltaic (PV) arrays made of frameless PV modules and a rail system. The present disclosure also provides various embodiments of clamps used to secure frameless PV modules to rails within a rail system. This specification and the accompanying drawings are to be regarded in an illustrative sense rather than a restrictive sense. Various modifications may be made thereto without departing from the spirit and scope of the present disclosure.

Figure 1:
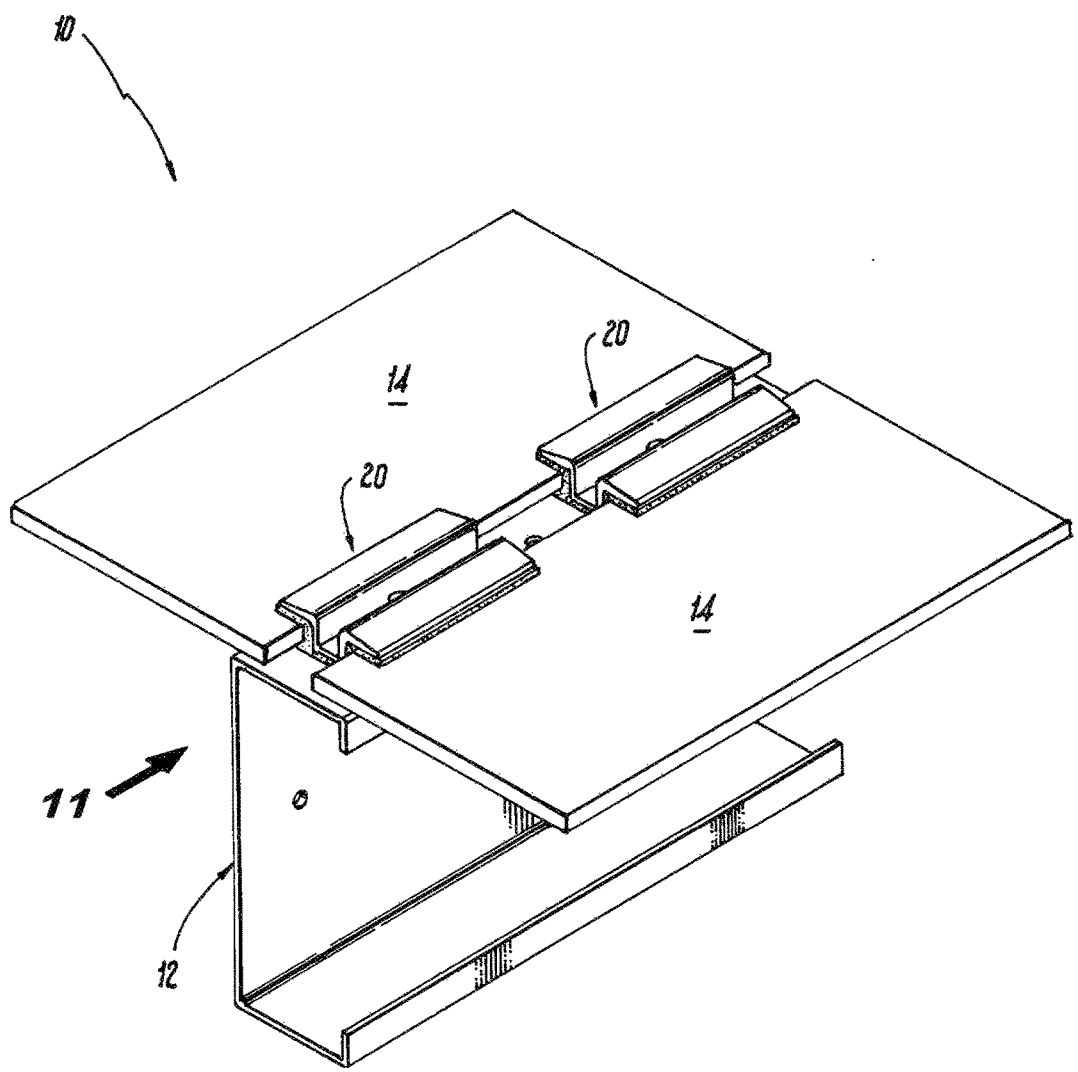
FIG. 1 is a top perspective view of an exemplary embodiment of a portion of a PV array according to the present disclosure, illustrating clamps according to the present disclosure securing two PV modules to a rail.
Figure 2:
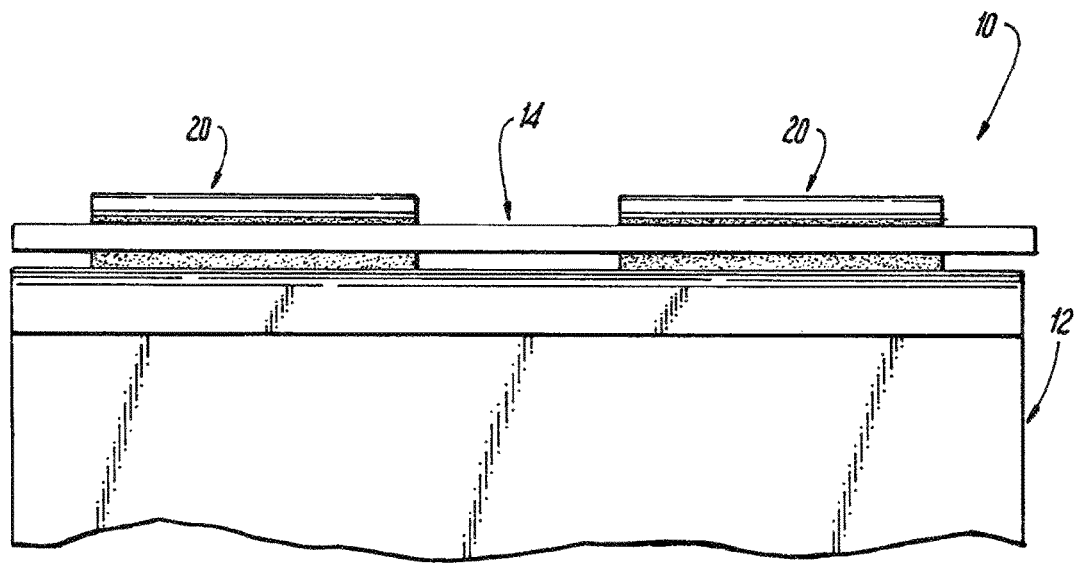
FIG. 2 is a side elevation view of the portion of the PV array of FIG. 1.
Figure 3:
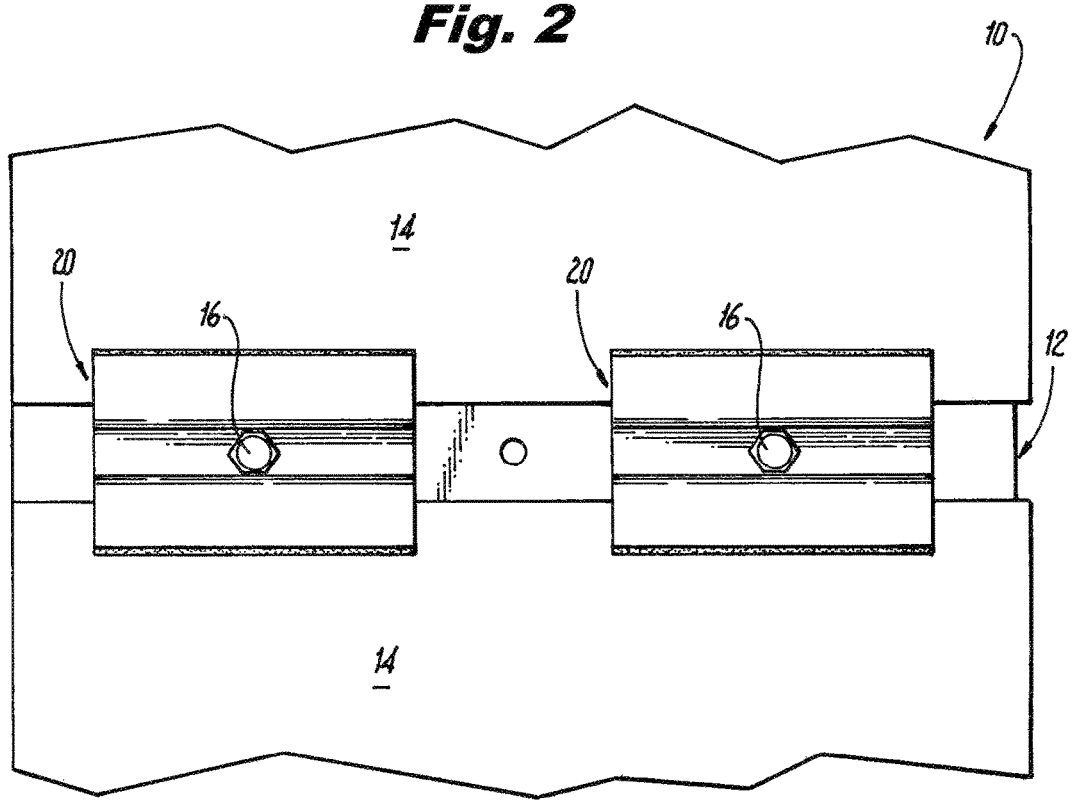
FIG. 3 is a top plan view of the portion of the PV array of FIG. 1.

Referring to FIGS. 1-3, a portion of a PV array 10 is shown. The PV array includes a rail 12, one or more frameless PV modules 14 and one or more clamps 20 used to secure the frameless PV modules 14 to the rail 12 using a fastener 16, such as a nut and bolt. The rail 12 may be any known type of rail used to support PV modules. The frameless PV modules may be any known frameless PV modules, for example, any thin-film or crystalline type photovoltaic modules.

Referring to FIGS. 4-7, an exemplary embodiment of a clamp according to the present disclosure is shown. In this exemplary embodiment, the clamp 20 includes a clamp cover 30 and a clamp grip 50. The clamp cover 30 has a base 32 and a pair of side walls 34 and 36 extending from the base and forming a U-shaped channel 38. A first end 34a of the first side wall 34, and a first end 36a of the second side wall 36 extending from the base, are substantially perpendicular to the base 32. A clamp arm 40 extends from a second end 34b of the side wall 34 in a direction away from the channel 38 such that a module contacting surface 40a of the clamp arm 40 is substantially perpendicular to the side wall 34. Similarly, a clamp arm 42 extends from a second end 36b of the side wall 36 in a direction away from the channel 38 such that a module contacting surface 42a of the clamp arm 42 is substantially perpendicular to the side wall 36. The base 32 and side walls 34 and 36 of the clamp cover may be made of a material that provides sufficient structural integrity to support a PV module. For example, materials such as stainless steel, aluminum and/or aluminum alloy may be used to fabricate the base 32 and side walls 34 and 36, which would also be suitable for instances where electrical bonding of the clamp 20 is needed, since such materials are also electrically conductive. However, one skilled in the art would readily appreciate that the base 32 and side walls 34 and 36 of the clamp cover 30 may be made of non-conductive materials, such as composites, or other electrically conductive materials for instances where electrical bonding is needed.

Figure 5:
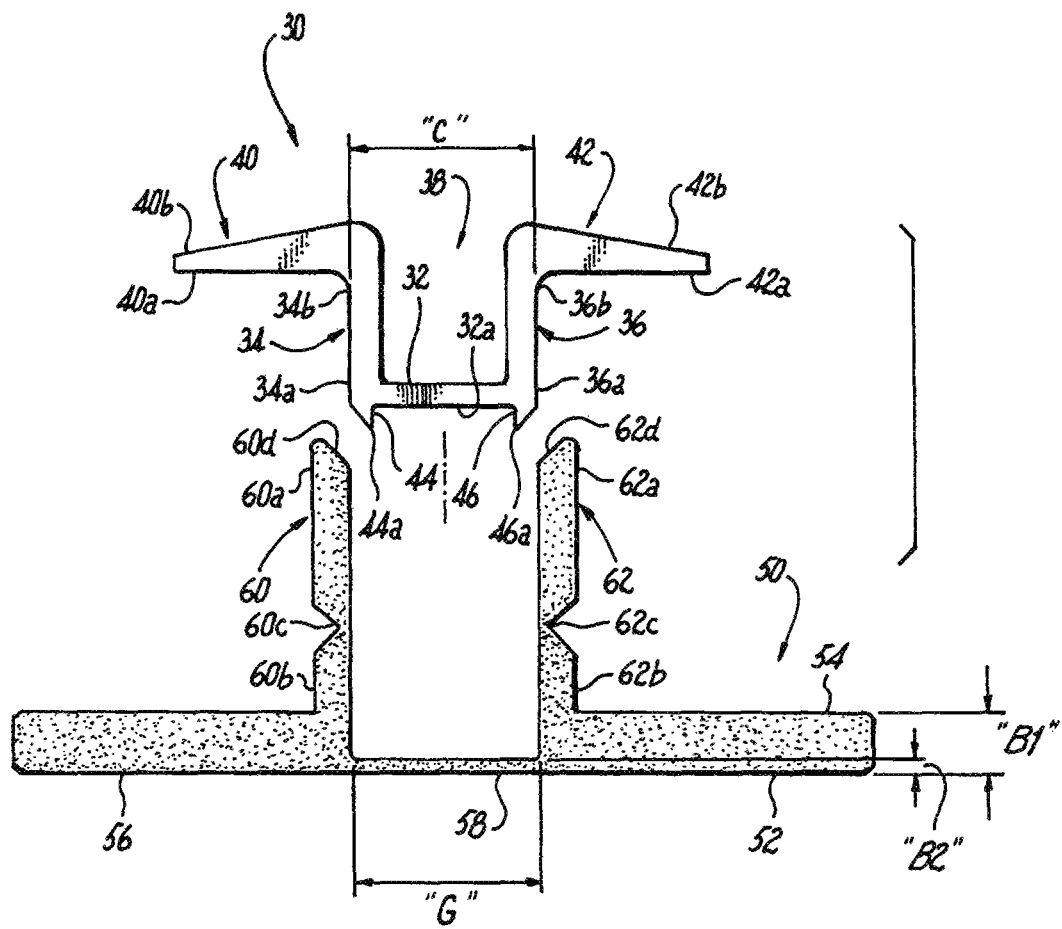
FIG. 5 is an end elevation view of the clamp of FIG. 4.
Figure 6:
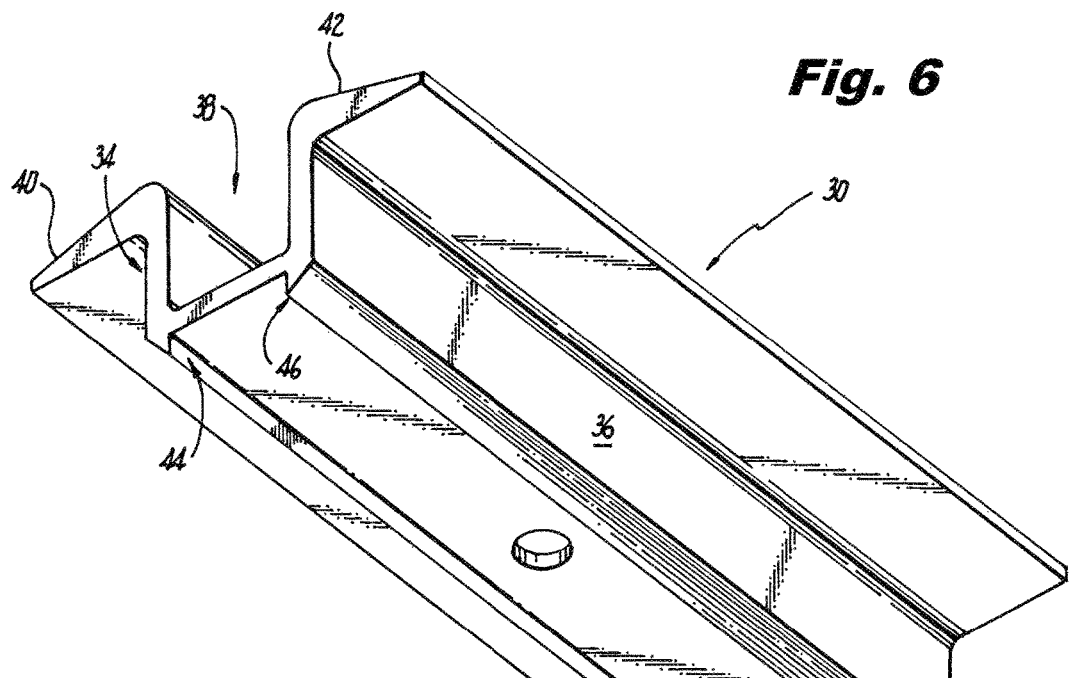
FIG. 6 is a bottom perspective view of the clamp cover of FIG. 4, illustrating a clamp leg extending from the clamp cover along the entire length of the clamp cover.
Figure 7:
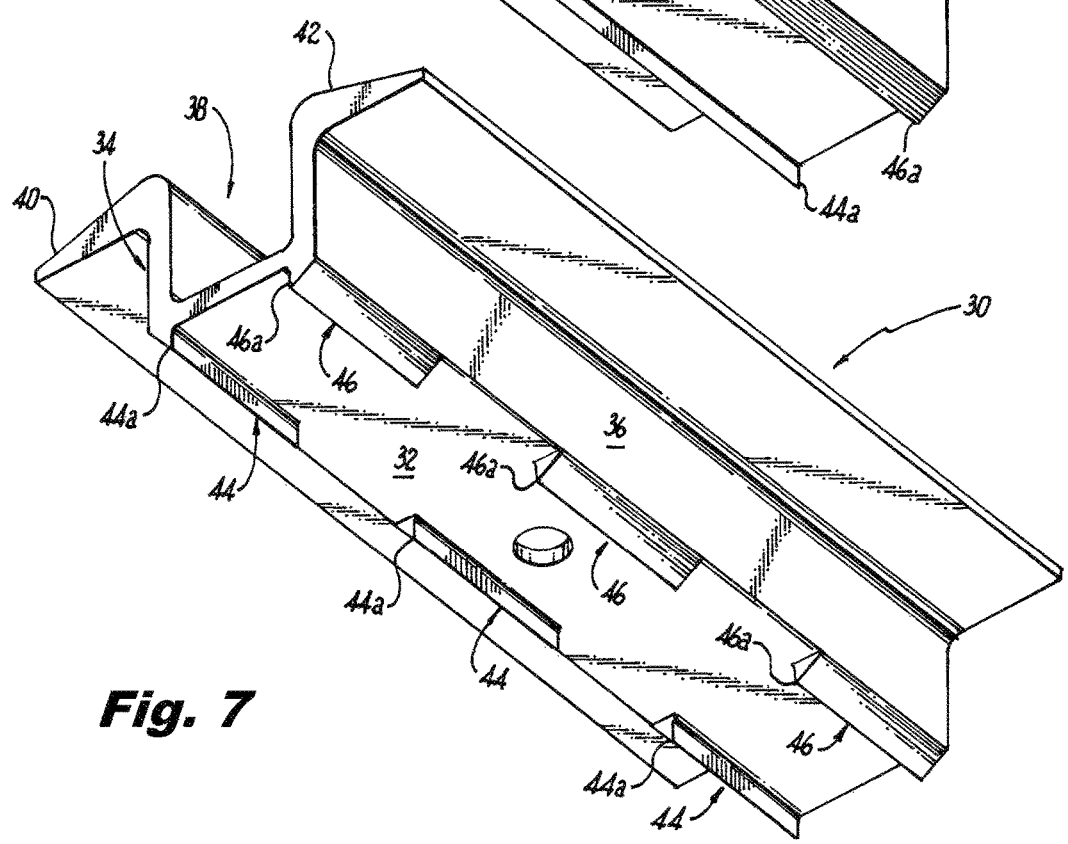
FIG. 7 is a bottom perspective view of another exemplary embodiment of the clamp cover of FIG. 5, illustrating multiple clamp legs extending from the clamp cover.

Extending from a bottom surface 32a of base 32 are two legs 44 and 46. One end of leg 44 contacts the bottom surface 32a of base 32, and one end of leg 46 contacts the bottom surface 32a of base 32. The distal end 44a and 46a of the legs 44 and 46, respectively, are free ends. Each leg 44 and 46 may be a singular leg extending the length of the clamp cover 30, as seen in FIG. 6, or the legs 44 and 46 can be segmented legs that are spaced apart along the length of the clamp cover 30, as seen in FIG. 7. The free ends of the legs 44 and 46 may end with a sharp point as seen in FIG. 5. The legs 44 and 46 of the clamp cover 30 may be made of a material that provides sufficient structural integrity to support a PV module and to cut through the clamp grip, as described in more detail below. For example, materials such as stainless steel, aluminum and/or aluminum alloy may be used to fabricate the legs 44 and 46, which would also be suitable for instances where electrical bonding of the clamp 20 is needed, since such materials are also electrically conductive. However, one skilled in the art would readily appreciate that the legs 44 and 46 of the clamp cover 30 may be made of non-conductive materials, such as composites, or other electrically conductive materials for instances where electrical bonding is needed.

It is noted that the base 32, side walls 34 and 36, clamp arms 40 and 42, and legs 44 and 46 can be molded as a unitary component, or they can be constructed from multiple component parts secured together by for example welded joints.

Figure 4:
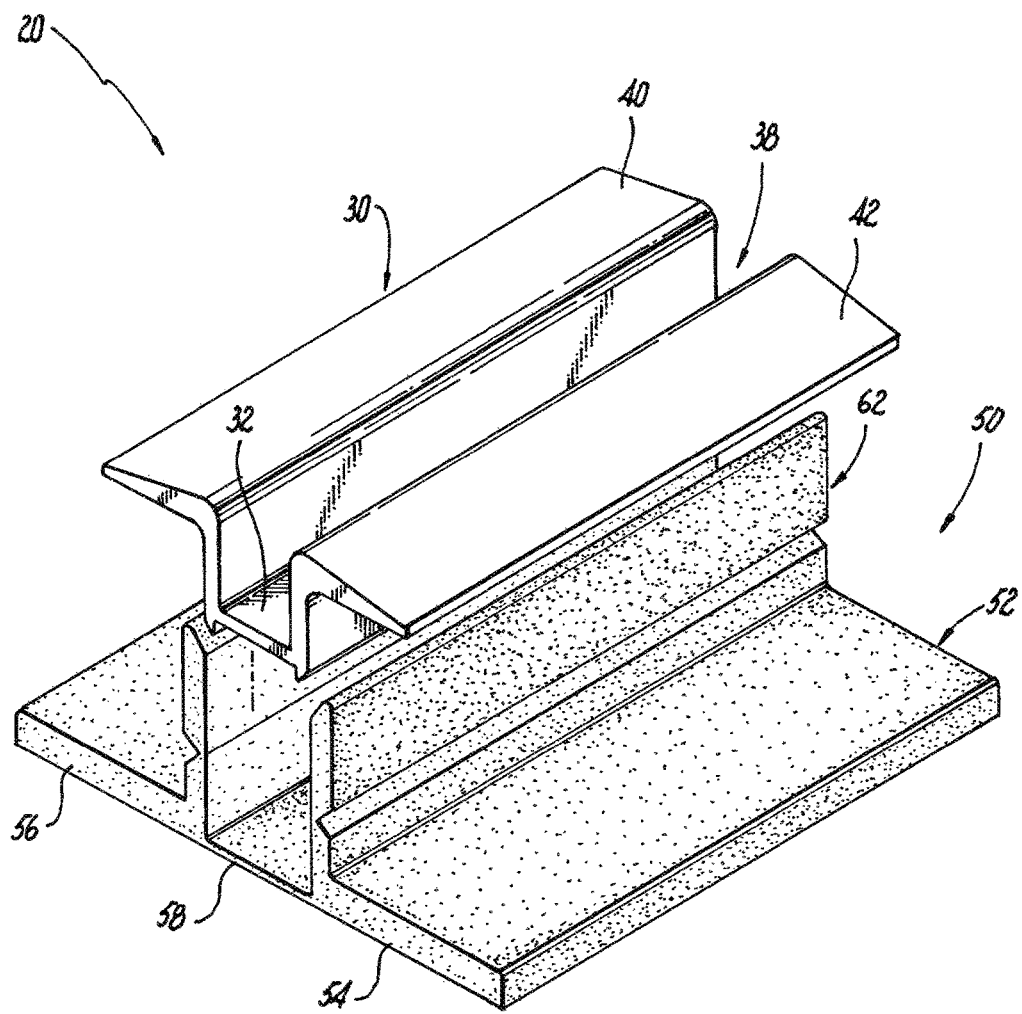
FIG. 4 is a top perspective view of an exemplary embodiment of a clamp according to the present disclosure, illustrating a clamp cover separated from a clamp grip.
Figure 9:
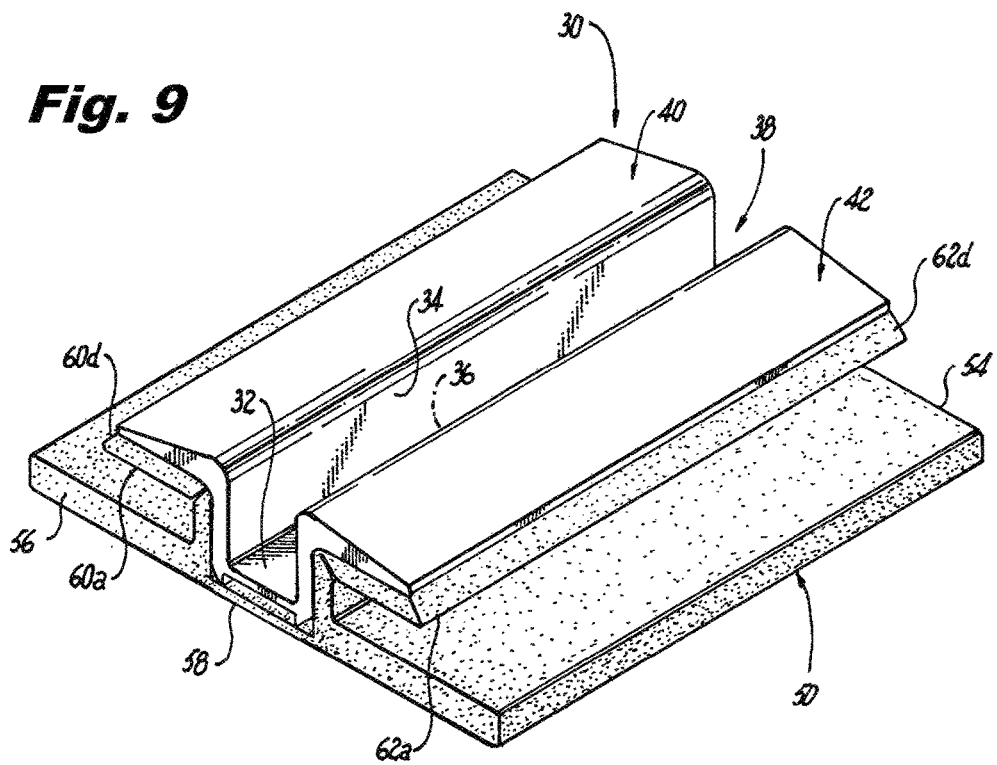
FIG. 9 is a top perspective view of the clamp of FIG. 4, illustrating the clamp cover engaged with the clamp grip.
Figure 10:
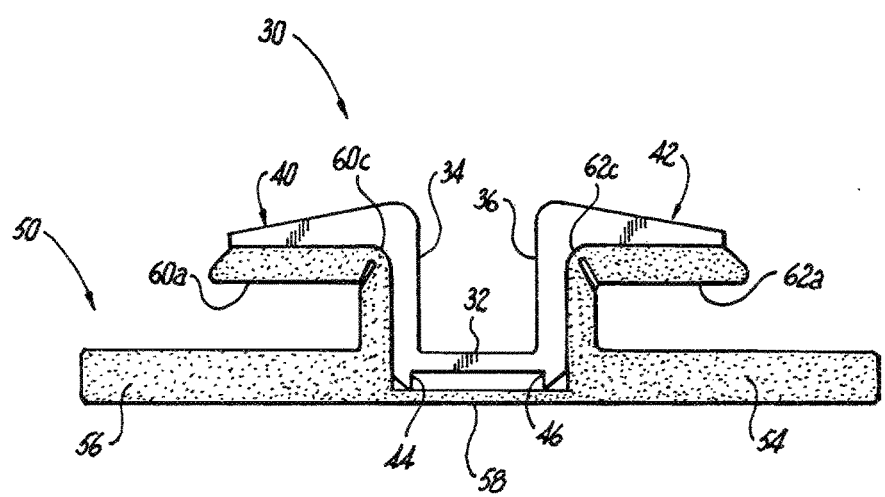
FIG. 10 is an end elevation view of the clamp of FIG. 9.

Referring to FIGS. 4 and 5, the clamp grip 50 has base 52 comprising a first base member 54, a second base member 56 and a bridge 58 joining the first base member to the second base member. In an exemplary embodiment, the first base member 54 and second member 56 have a thickness of "B1," and the bridge has a thickness "B2" that is less the thickness B1. For example, the first base member 54 may have a thickness "B1" of about 3 mm to about 5 mm and the bridge may have a thickness "B2" of about 0.5 mm to about 1 mm. The clamp grip 50 also includes a pair of spaced apart side walls 60 and 62 extending from the base. The side walls 60 and 62 are spaced apart a distance "G" between the inside surfaces of the side walls 60 and 62, which is sufficient to permit the base 32 and side walls 34 and 36 of the clamp cover 20 to fit between the side walls 60 and 62. Side wall 60 has an upper wall 60a and a lower wall 60b separated by a notch 60c. Similarly, side wall 62 has an upper wall 62a and a lower wall 62b separated by a notch 62c. The notches 60c and 62c permit the upper wall of each side wall to bend about 90 degrees relative to the lower wall when pressure is applied to a caroming surface 60d and 62d of the upper side walls 60a and 62a, as shown in FIGS. 9 and 10. The clamp grip 50 is made of a flexible, non-conductive material, such as rubber, to electrically isolate the side walls 34 and 36 from a PV module positioned within the clamp 20 as described in more detail below.

Figure 8:
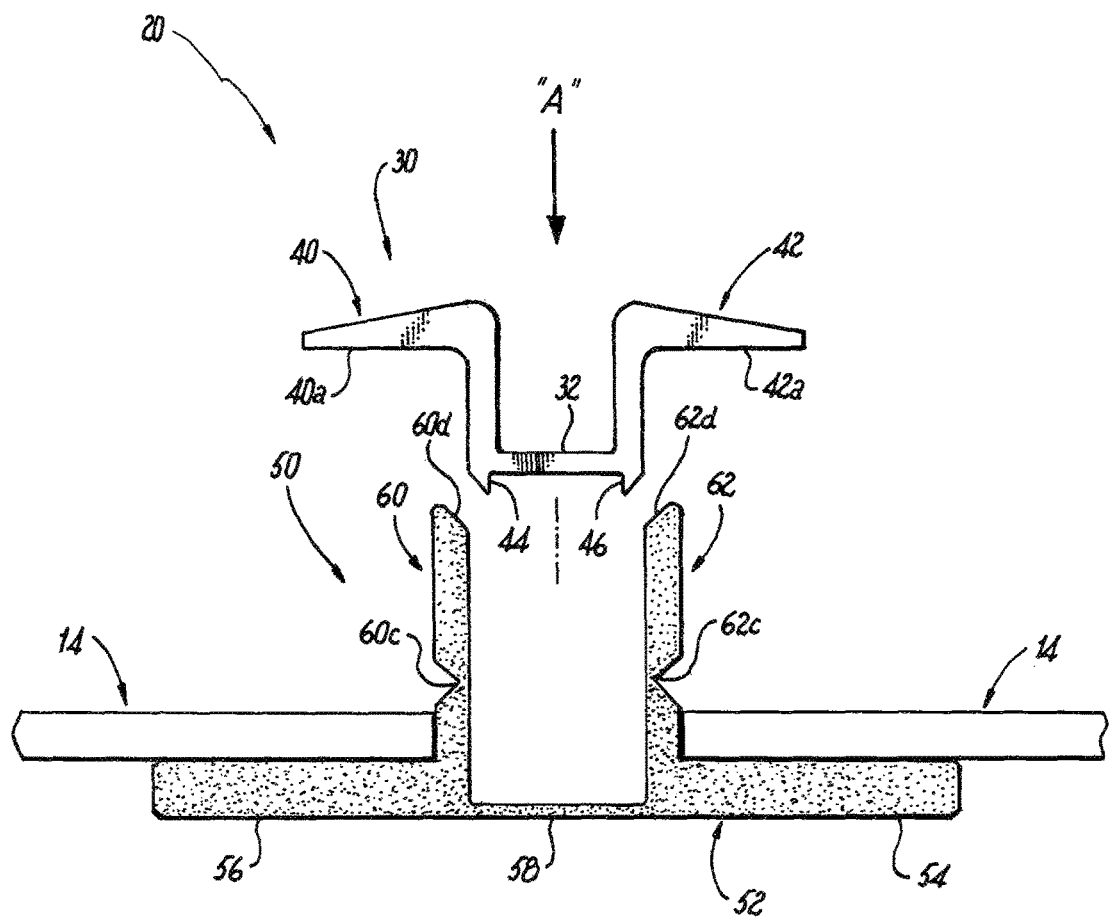
FIG. 8 is an end elevation view of the clamp of FIG. 4, illustrating the installation of PV modules.
Figure 11:
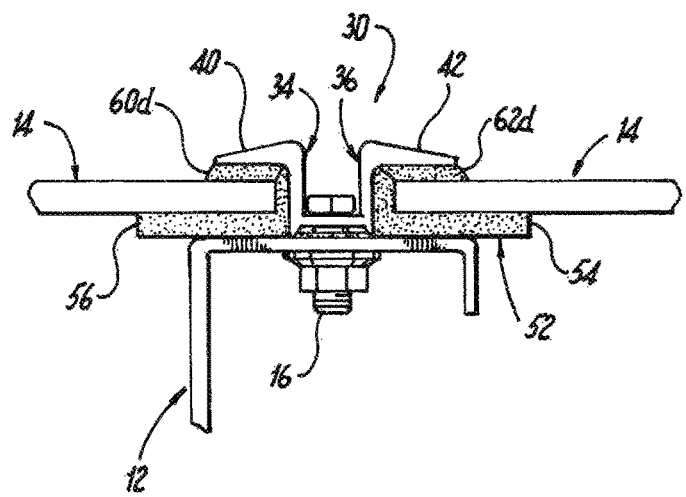
FIG. 11 is an end elevation view of the portion of the PV array of FIG. 1, illustrating a fastener securing the clamp to a rail.
Figure 12:
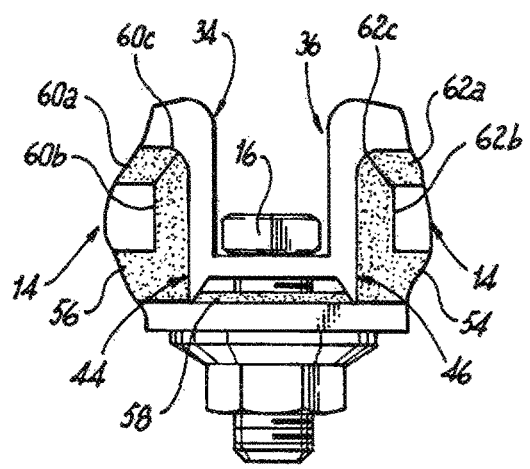
FIG. 12 is an enlarged view of a portion of the end elevation view of FIG. 11.

Referring to FIGS. 8-12, a description of the assembly of a frameless PV module 14 into a clamp 20 will be described. Initially, a base 52 of a clamp grip 50 is rested on a rail 12 so that an aperture in the center of the bridge 58 of the base 52 is aligned with an aperture in the rail. As seen in FIG. 8, one frameless PV module 14 is positioned to rest on the first base member 54 of the base 52, and another frameless PV module is positioned to rest on the second base member 56 of the base 52. The clamp cover 30 is then moved toward the clamp grip 50, in the direction of arrow "A", so that the module contacting surface 40a of the clamp arm 40 engages the cam surface 60d of upper wall 60a, and so that the module contacting surface 42a of the clamp arm 42 engages the cam surface 62d of upper wall 62a. Continued downward movement of the clamp cover 30 towards the clamp grip 50 causes the upper walls 60a and 62a to bend along the notches 60c and 62c in a direction away from the channel and towards the PV module 14, as seen in FIGS. 9 and 10, forming a pocket. With the side walls 34 and 36 of the clamp cover 30 positioned between the walls 60 and 62 of the clamp grip 50, a fastener 16 (e.g., bolt and nut) can be inserted through the aligned apertures in the clamp cover 30, clamp grip 50 and the rail 12 and tightened, as seen in FIGS. 11 and 12. As the fastener 16 is tightened to a point where the cutting edges 44a and 46a of legs 44 and 46, respectively, cut or pass through the bridge 58 in the clamp grip 50 to engage the top surface of the rail. The cutting edges of the legs 44 and 46 engaging the rail act as a stop to prevent further tightening of the clamp 20 to the rail 12 so as not to over tighten the clamp 20 around the frameless PV module.

Figure 13:
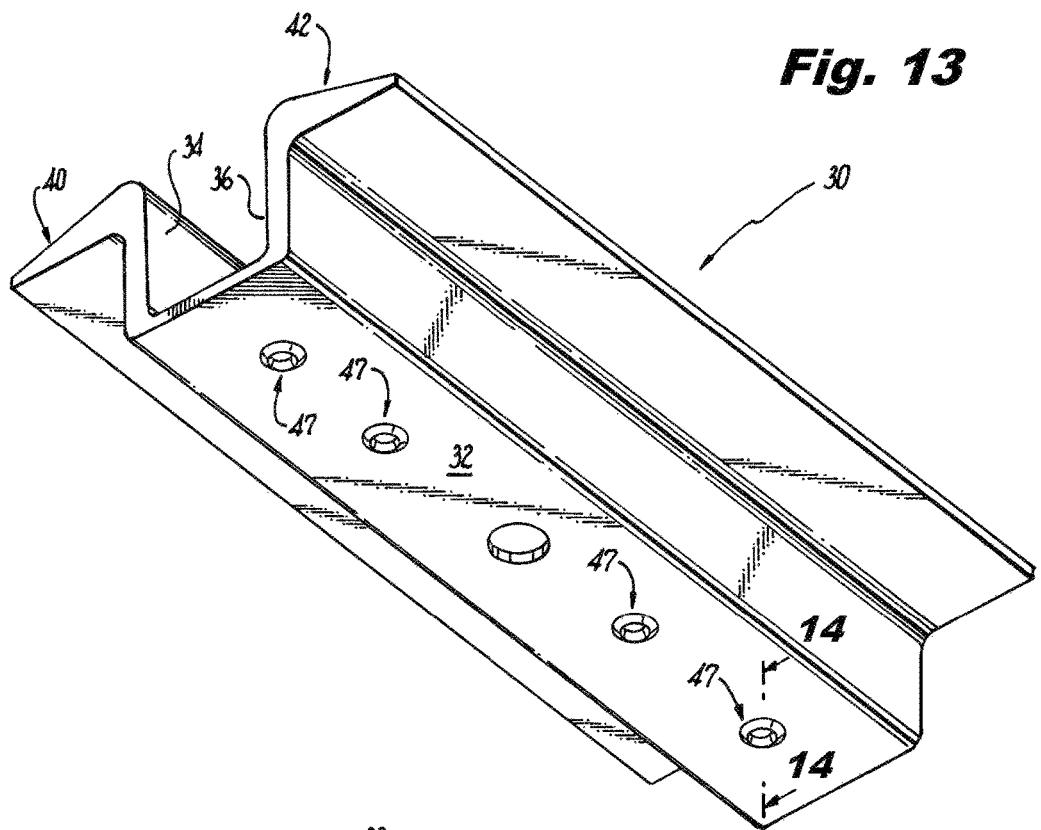
FIG. 13 is a bottom perspective view of another exemplary embodiment of the clamp cover of FIG. 4, illustrating multiple bonding members extending from a base of the clamp cover.
Figure 14:
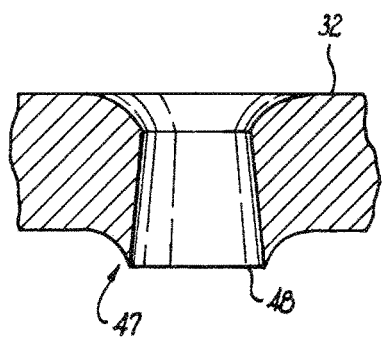
FIG. 14 is an enlarged view of an exemplary embodiment of the bonding member of FIG. 13.
Figure 15:
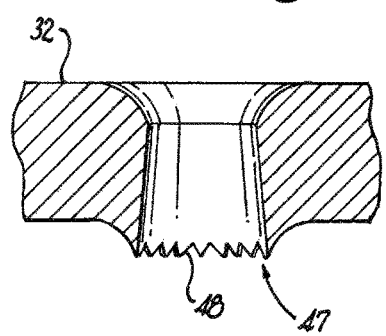
FIG. 15 is an enlarged view of another exemplary embodiment of the bonding member of FIG. 13.

Turning to FIGS. 13-15, another exemplary embodiment of the clamp cover 30 according to the present disclosure is shown. In this exemplary embodiment, the base 32 includes at least one electrical bonding member 47. In the embodiment shown, a plurality of electrical bonding members 47 extend from the base 32. Each electrical bonding member 47 may have one or more piercing surfaces 48 to cut through the bridge 58 of the clamp grip 50, and to cut through or pierce any non-conductive coatings, e.g., oxide, paint and/or anodization, on the rail 12 to contact the conductive metal of the rail. The piercing surfaces may be in the form of for example a volcano, seen in FIG. 14, a serrated volcano, seen in FIG. 15, a pointed tip or other serrated tip. However, one skilled in the art would readily appreciate that the structure of the piercing surfaces may come in many forms or shapes sufficient to cut through the bridge 58 of the clamp grip 50, and to cut through or pierce any non-conductive coatings on the rail.

Figure 16:
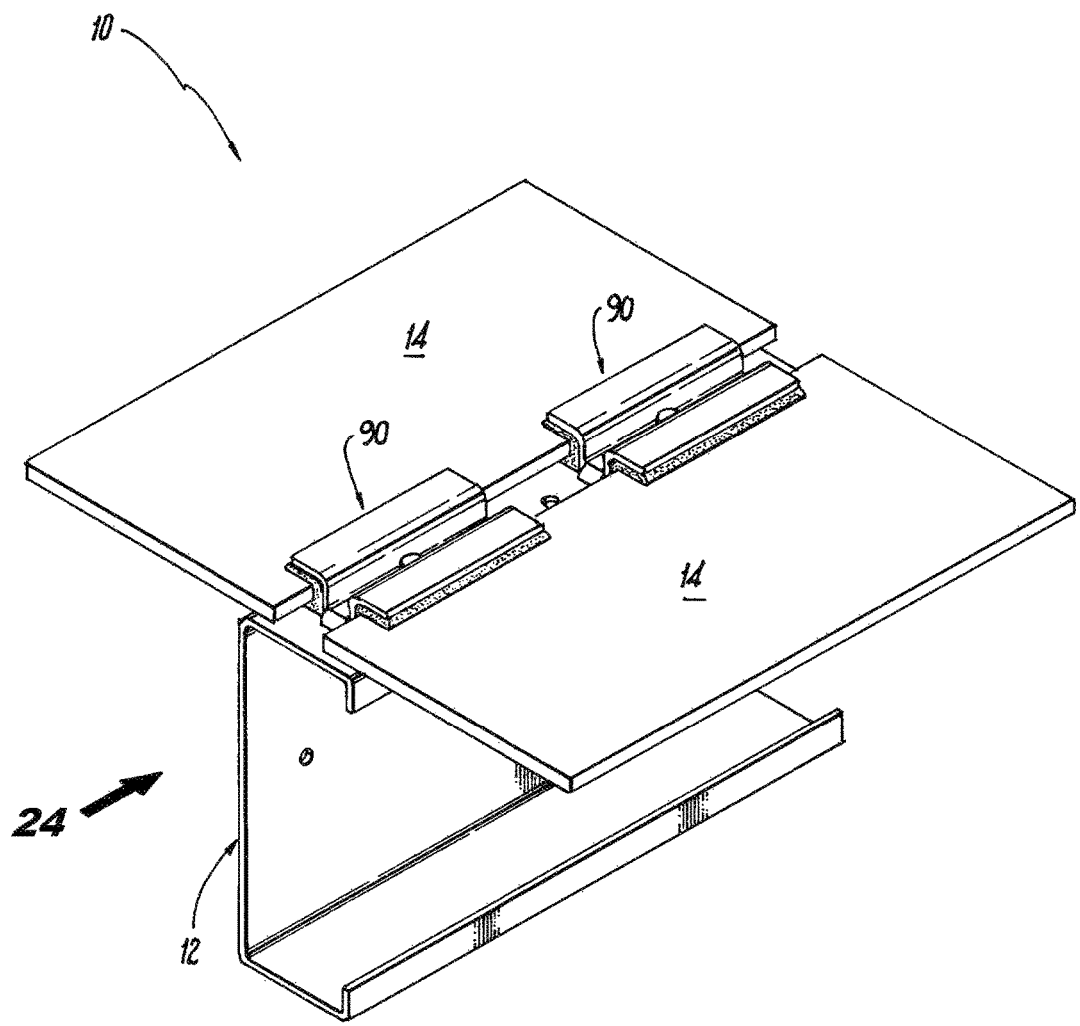
FIG. 16 is a top perspective view of another exemplary embodiment of a portion of a PV array according to the present disclosure, illustrating another exemplary embodiment of clamps according to the present disclosure securing two PV modules to a rail.
Figure 17:
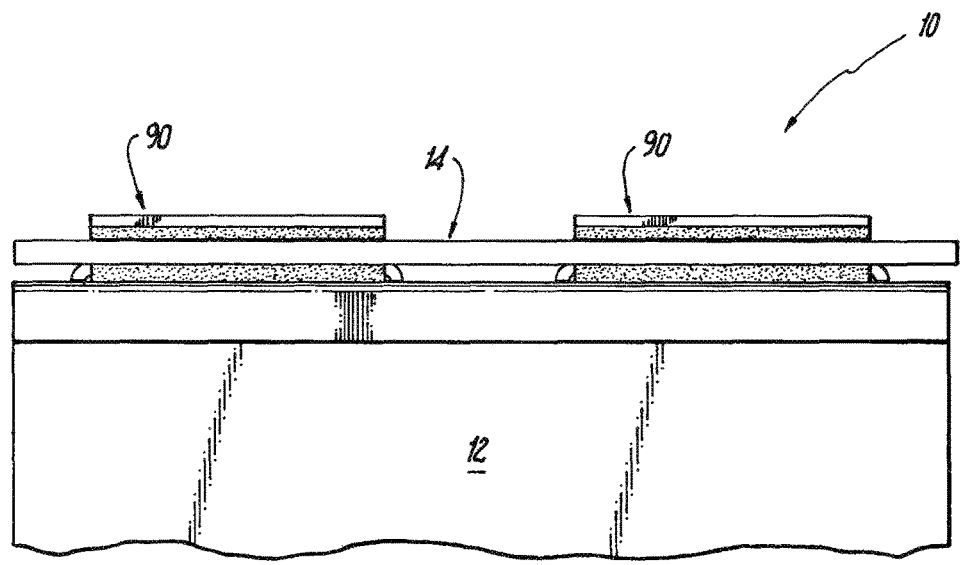
FIG. 17 is a side elevation view of the portion of the PV array of FIG. 16.
Figure 18:
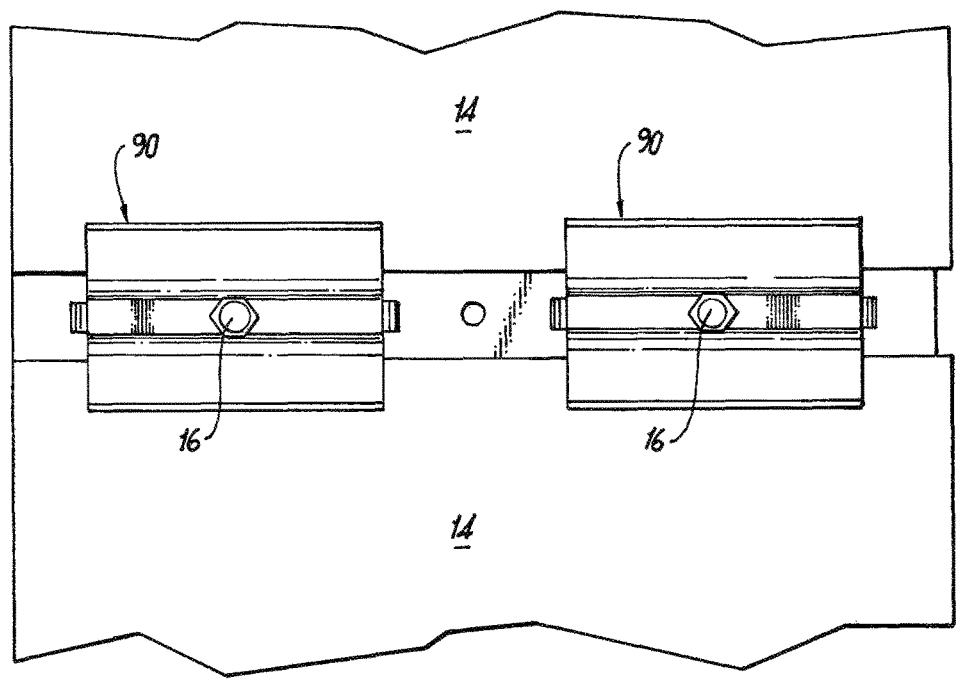
FIG. 18 is a top plan view of the portion of the PV array of FIG. 16.

Referring to FIGS. 16-18, a portion of a PV array 10 is shown. The PV array includes a rail 12, one or more frameless PV modules 14 and one or more clamps 90 used to secure the frameless PV modules 14 to the rail 12 using a fastener 16, such as a nut and bolt. The rail 12 may be any known type of rail used to support PV modules. The frameless PV modules may be any known frameless PV modules, for example, any thin-film or crystalline type photovoltaic modules.

Figure 19:
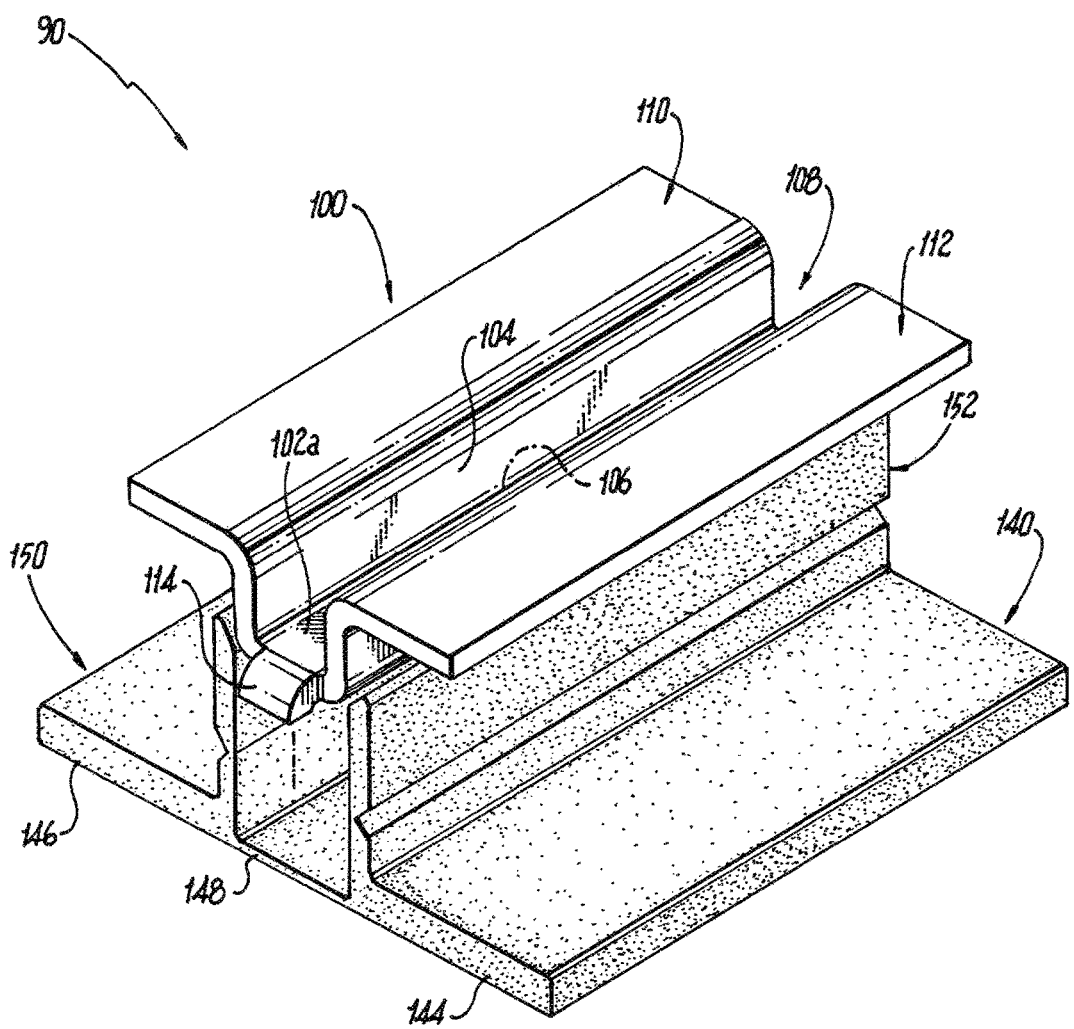
FIG. 19 is a top perspective view of another exemplary embodiment of a clamp according to the present disclosure, illustrating a clamp cover separated from a clamp grip.
Figure 20:
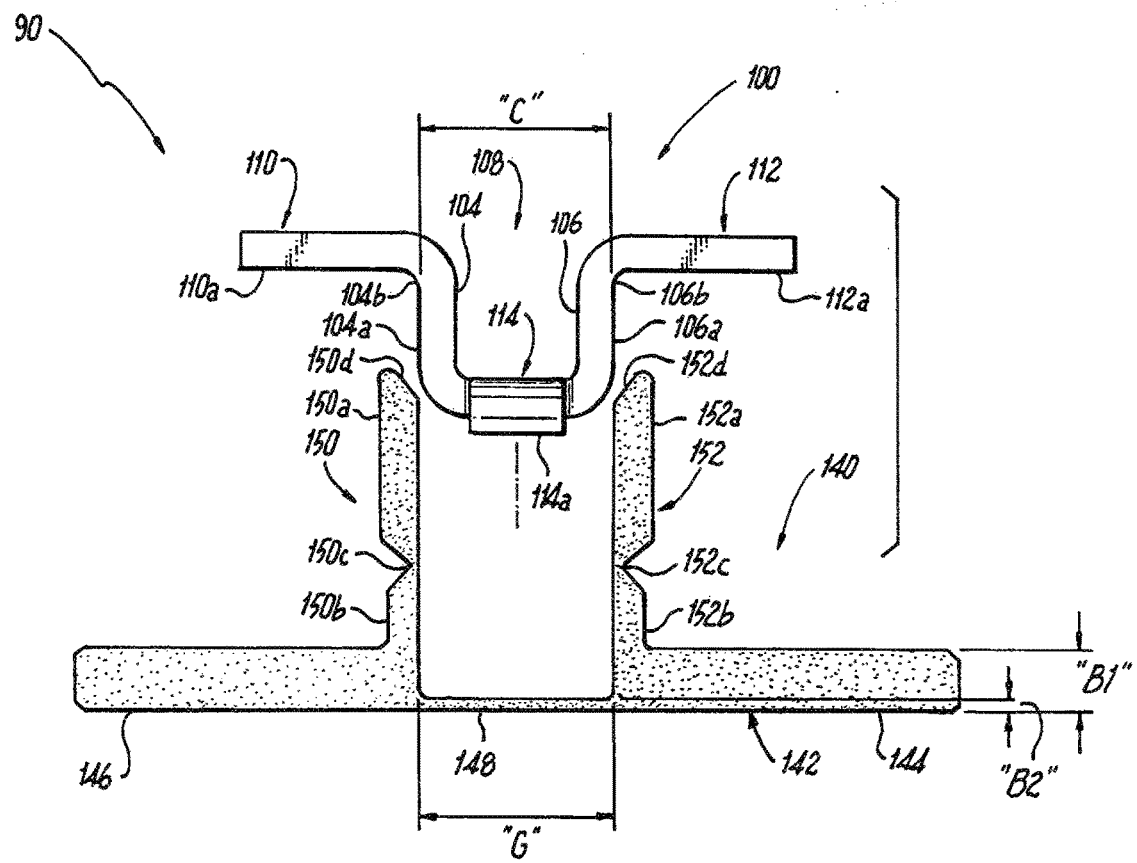
FIG. 20 is an end elevation view of the clamp of FIG. 19.

Referring to FIGS. 19 and 20, another exemplary embodiment of a clamp 90 according to the present disclosure is shown. In this exemplary embodiment, the clamp 90 includes a clamp cover 100 and a clamp grip 140. The clamp cover 100 has a base 102 and a pair of side walls 104 and 106 extending from the base and forming a U-shaped channel 108. A first end 104a of the first side wall 104, and a first end 106a of the second side wall 106 extending from the base, are substantially perpendicular to the base 102, but may include rounded edges as shown in FIG. 20. A clamp arm 110 extends from a second end 104b of the side wall 104 in a direction away from the channel 108 such that a module contacting surface 110a of the clamp arm 110 is substantially perpendicular to the side wall 104. Similarly, a clamp arm 112 extends from a second end 106b of the side wall 106 in a direction away from the channel 108 such that a module contacting surface 112a of the clamp arm 112 is substantially perpendicular to the side wall 106. The base 102 and side walls 104 and 106 of the clamp cover may be made of a material that provides sufficient structural integrity to support a PV module. For example, materials such as stainless steel, aluminum and/or aluminum alloy may be used to fabricate the base 102 and side walls 104 and 106, which would also be suitable for instances where electrical bonding of the clamp 90 is needed since such materials are also electrically conductive. However, one skilled in the art would readily appreciate that the base 102 and side walls 104 and 106 of the clamp cover 90 may be made of non-conductive materials, such as composites, or other electrically conductive materials for instances where electrical bonding is needed.

Figure 26:
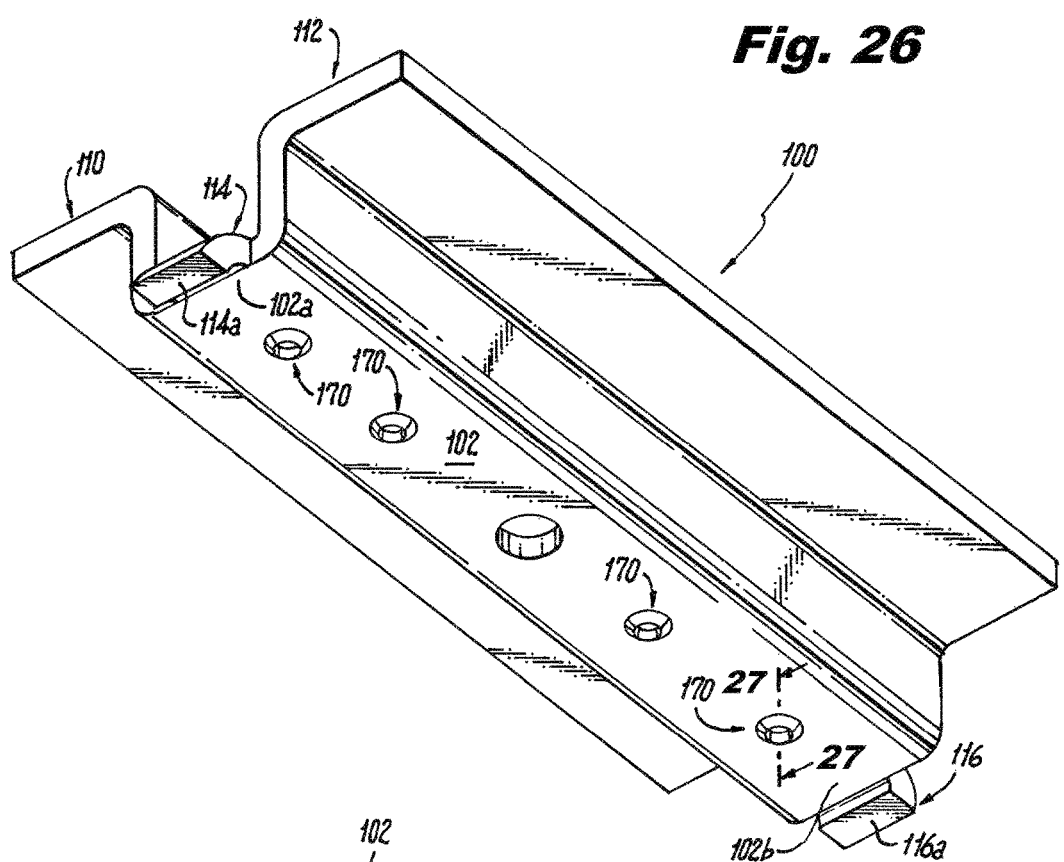
FIG. 26 is a bottom perspective view of another exemplary embodiment of the clamp cover of FIG. 19, illustrating multiple bonding members extending from the clamp cover.

Extending from each end of the base 102 are two legs 114 and 116, seen in FIG. 26. One end of leg 114 contacts the end edge 102a of base 102, and one end of leg 116 contacts the end edge 102a of base 102. The distal end 114a and 116a of the legs 114 and 116 are free ends as shown. The legs 114 and 116 of the clamp cover 90 may be made of a material that provides sufficient structural integrity to support a PV module, as described in more detail below. For example, materials such as stainless steel, aluminum and/or aluminum alloy may be used to fabricate the legs 114 and 116, which would also be suitable for instances where electrical bonding of the clamp 90 is needed, since such materials are also electrically conductive. However, one skilled in the art would readily appreciate that the legs 114 and 116 of the clamp cover 90 may be made of non-conductive materials, such as composites, or other electrically conductive materials for instances where electrical bonding is needed.

It is noted that the base 102, side walls 104 and 106, clamp arms 110 and 112, and legs 114 and 116 can be molded as a unitary component, or they can be constructed from multiple component parts secured together by for example welded joints.

Figure 22:
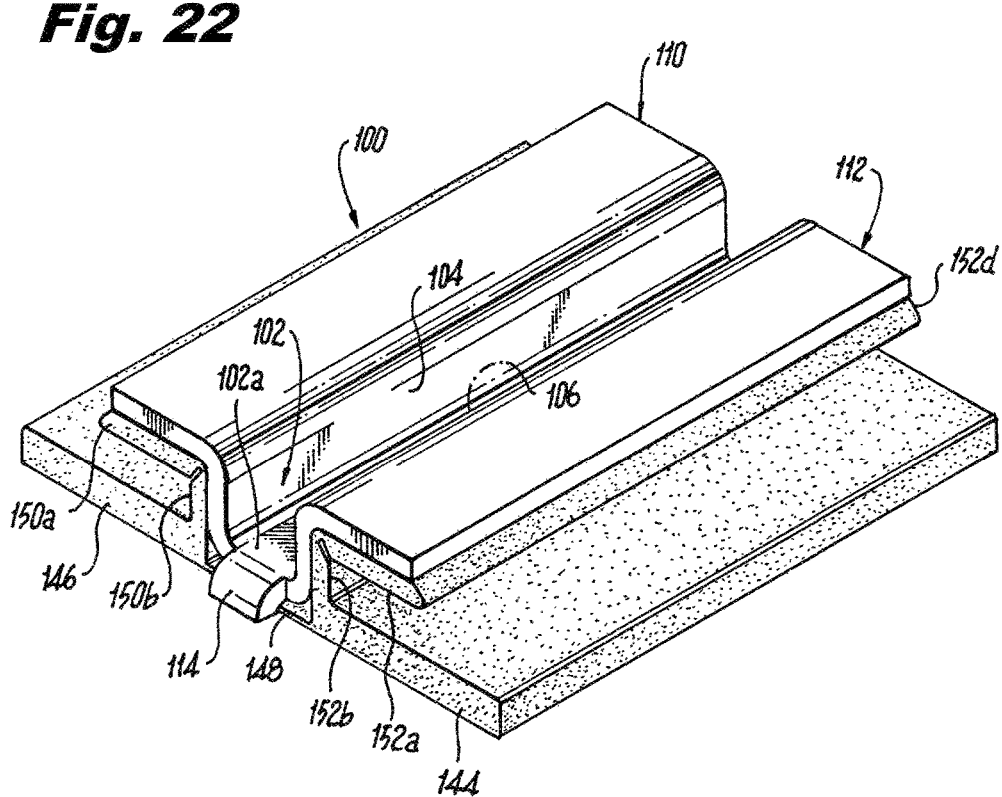
FIG. 22 is a top perspective view of the clamp of FIG. 19, illustrating the clamp cover engaged with the clamp grip.
Figure 23:
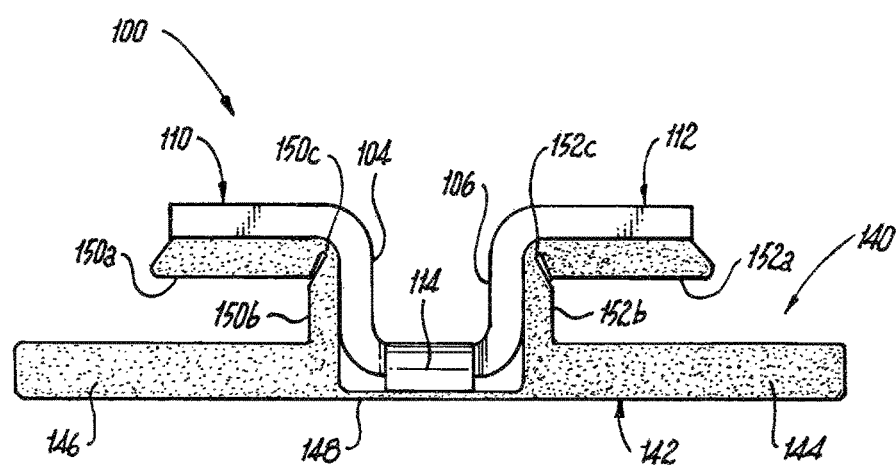
FIG. 23 is an end elevation view of the clamp of FIG. 22.

Referring to FIGS. 19 and 20, the clamp grip 140 has base 142 comprising a first base member 144, a second base member 146 and a bridge 148 joining the first base member to the second base member. In an exemplary embodiment, the first base member 144 and second member 146 have a thickness of "B1" and the bridge has a thickness "B2" that is less the thickness B1. For example, the first base member 144 may have a thickness "B1" of about 3 mm to about 5 mm and the bridge may have a thickness "B2" of about 0.5 mm to about 1 mm. The clamp grip 140 also includes a pair of spaced apart side walls 150 and 152 extending from the base. The side walls 150 and 152 are spaced apart a distance "G" between the inside surfaces of the side walls 150 and 152, which is sufficient to permit the base 102 and side walls 104 and 106 of the clamp cover 100 to fit between the side walls 150 and 152. Side wall 150 has an upper wall 150a and a lower wall 150b separated by a notch 150c. Similarly, side wall 152 has an upper wall 152a and a lower wall 152b separated by a notch 152c. The notches 150c and 152c permit the upper wall of each side wall to bend about 90 degrees relative to the lower wall when pressure is applied to a camming surface 150d and 152d of the upper walls 150a and 152a, as shown in FIGS. 22 and 23. The clamp grip 140 is made of a flexible, non-conductive material, such as rubber, to electrically isolate the side walls 104 and 106 from a PV module positioned within the clamp 90) as described in more detail below.

Figure 21:
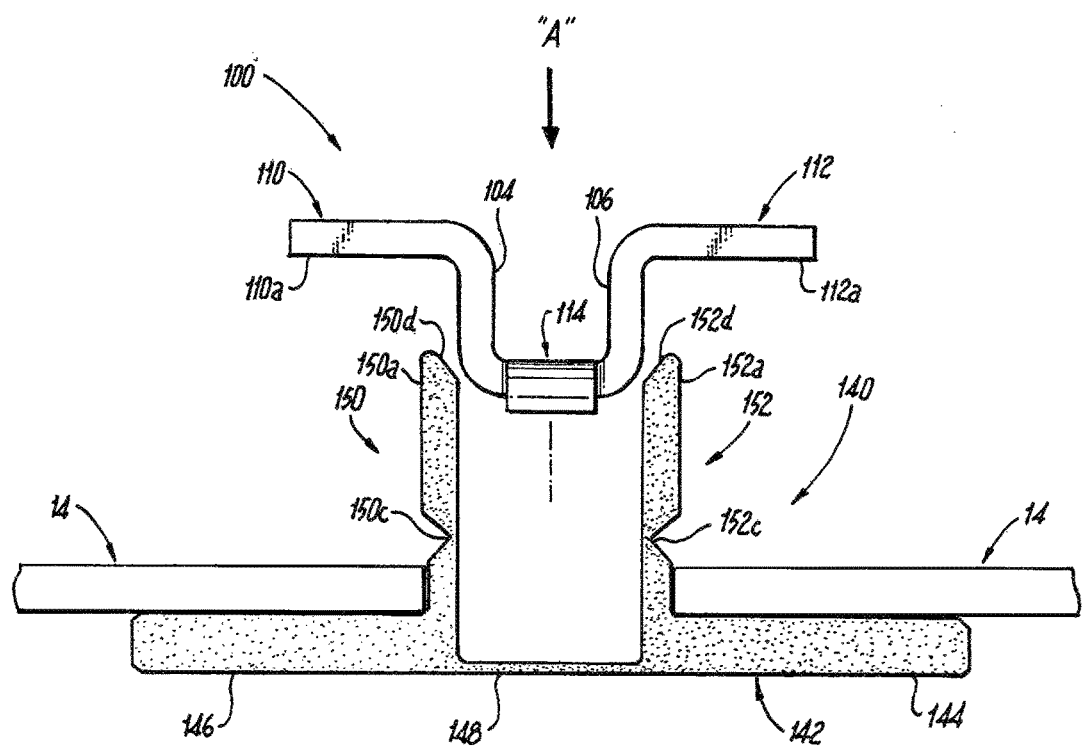
FIG. 21 is an end elevation view of the clamp of FIG. 19, illustrating the installation of PV modules.
Figure 24:
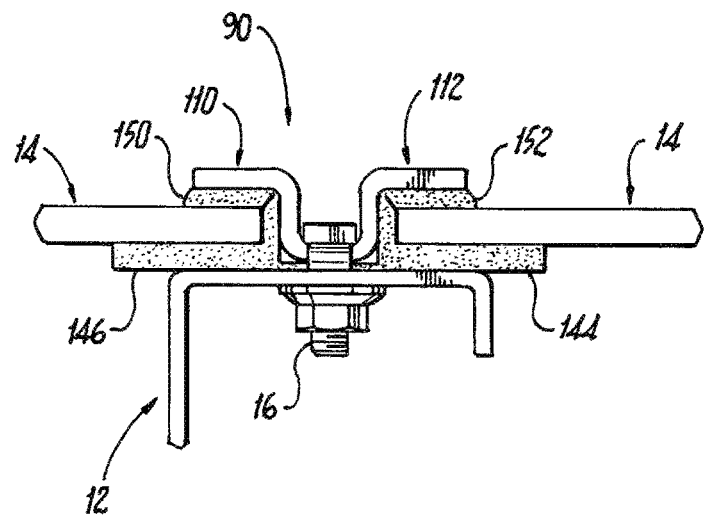
FIG. 24 is an end elevation view of the portion of the PV array of FIG. 16, illustrating a fastener securing the clamp to a rail.
Figure 25:
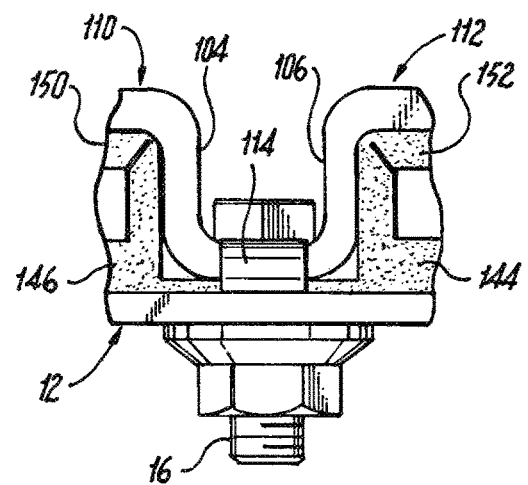
FIG. 25 is an enlarged view of a portion of the end elevation view of FIG. 24.
Figure 27:
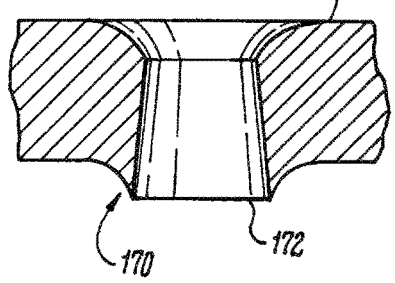
FIG. 27 is an enlarged view of an exemplary embodiment of the bonding member of FIG. 26.
Figure 28:
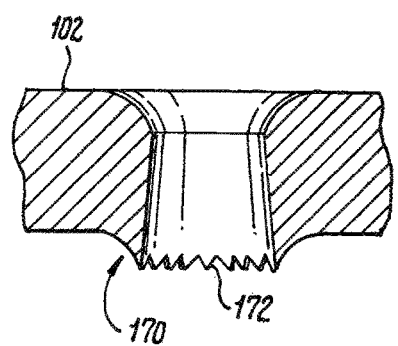
FIG. 28 is an enlarged view of another exemplary embodiment of the bonding member of FIG. 26.

Referring to FIGS. 21-25, a description of the assembly of a frameless PV module 14 into a clamp 90 will be described. Initially, a base 142 of a clamp grip 140 is rested on a rail 12 so that an aperture in the center of the bridge 148 of the base 142 is aligned with an aperture in the rail. As seen in FIG. 21, one frameless MT module 14 is positioned to rest on the first base member 144 of the base 142, and another frameless PV module is positioned to rest on the second base member 146 of the base 142. The clamp cover 100 is then moved toward the clamp grip 140, in the direction of arrow "A", so that the module contacting surface 110a of the clamp arm 110 engages the camming surface 150d of upper wall 150a, and so that the module contacting surface 112a of the clamp arm 112 engages the camming surface 152d of upper wall 152a, Continued downward movement of the clamp cover 100 towards the clamp grip 140 causes the upper walls 150a and 152a to bend along the notches 150c and 152c in a direction away from the channel and towards the PV module 14, as seen in FIGS. 22 and 23, forming a pocket. With the side walls 104 and 106 of the clamp cover 100 positioned between the walls 150 and 152 of the clamp grip 140, a fastener 16 (e.g., bolt and nut) can be inserted through the aligned apertures in the clamp cover 100, clamp grip 140 and the rail 12 and tightened, as seen in FIGS. 24 and 25. As the fastener 16 is tightened, the legs 114 and 116, respectively, apply pressure to the rail 12 to compress the legs against the rail and secure the frameless PV module to the clamp 90. Further tightening of the fastener 16 causes the legs 114 and 116 to further engage the top surface of the rail which will then act as a stop to prevent further tightening of the clamp 90 to the rail 12 so as not to over tighten the clamp 90 around the frameless PV modules Turning to FIGS. 26-28, another exemplary embodiment of the clamp cover 100 according to the present disclosure is shown. In this exemplary embodiment, the base 102 includes at least one electrical bonding member 170. In the embodiment shown, a plurality of electrical bonding members 170 extend from the base 102. Each electrical bonding member 170 may have one or more piercing surfaces 172 to cut through the bridge 148 of the clamp grip 140, and to cut through or pierce any non-conductive coatings, e.g., oxide, paint and/or anodization, on the rail 12 to contact the conductive metal of the rail. The piercing surfaces may be in the form of for example a volcano, seen in FIG. 27, a serrated volcano, seen in FIG. 28, a pointed tip or other serrated tip. However, one skilled in the art would readily appreciate that the structure of the piercing surfaces may come in many forms or shapes sufficient to cut through the bridge 148 of the clamp grip 140, and to cut through or pierce any non-conductive coatings on the rail.

Figure 29:
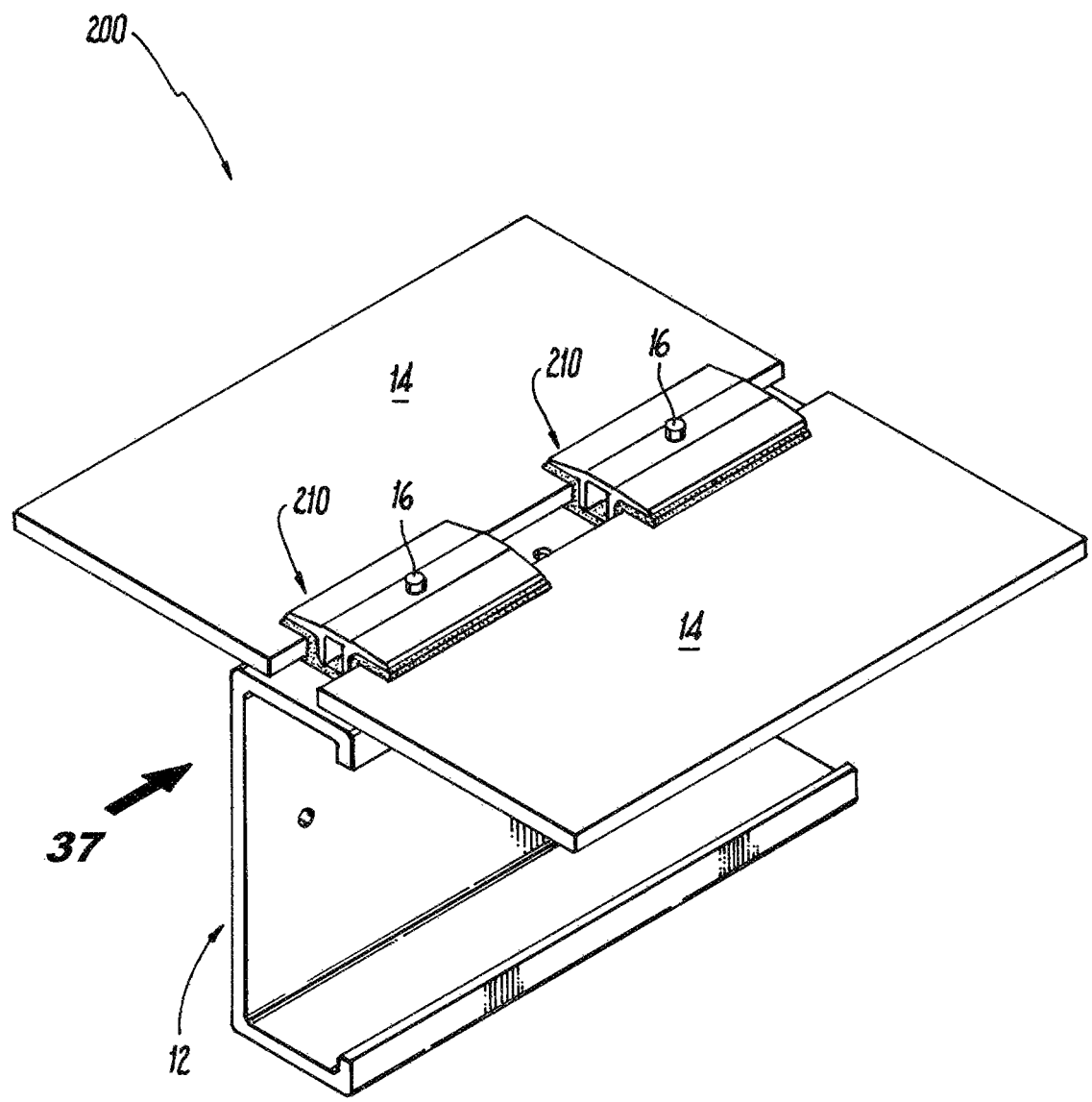
FIG. 29 is a top perspective view of another exemplary embodiment of a portion of a PV array according to the present disclosure, illustrating clamps according to the present disclosure securing two PV modules to a rail.

Referring to FIG. 29, a portion of a PV array 200 is shown. The PV array includes a rail 12, one or more frameless PV modules 14 and one or more clamps 210 used to secure the frameless PV modules 14 to the rail 12 using a fastener 16, such as a threaded nut into threaded hole in the rail 12. The rail 12 may be any known type of rail used to support PV modules. The frameless PV modules may be any known frameless PV modules, for example, any thin-film or crystalline type photovoltaic modules.

Figure 30:
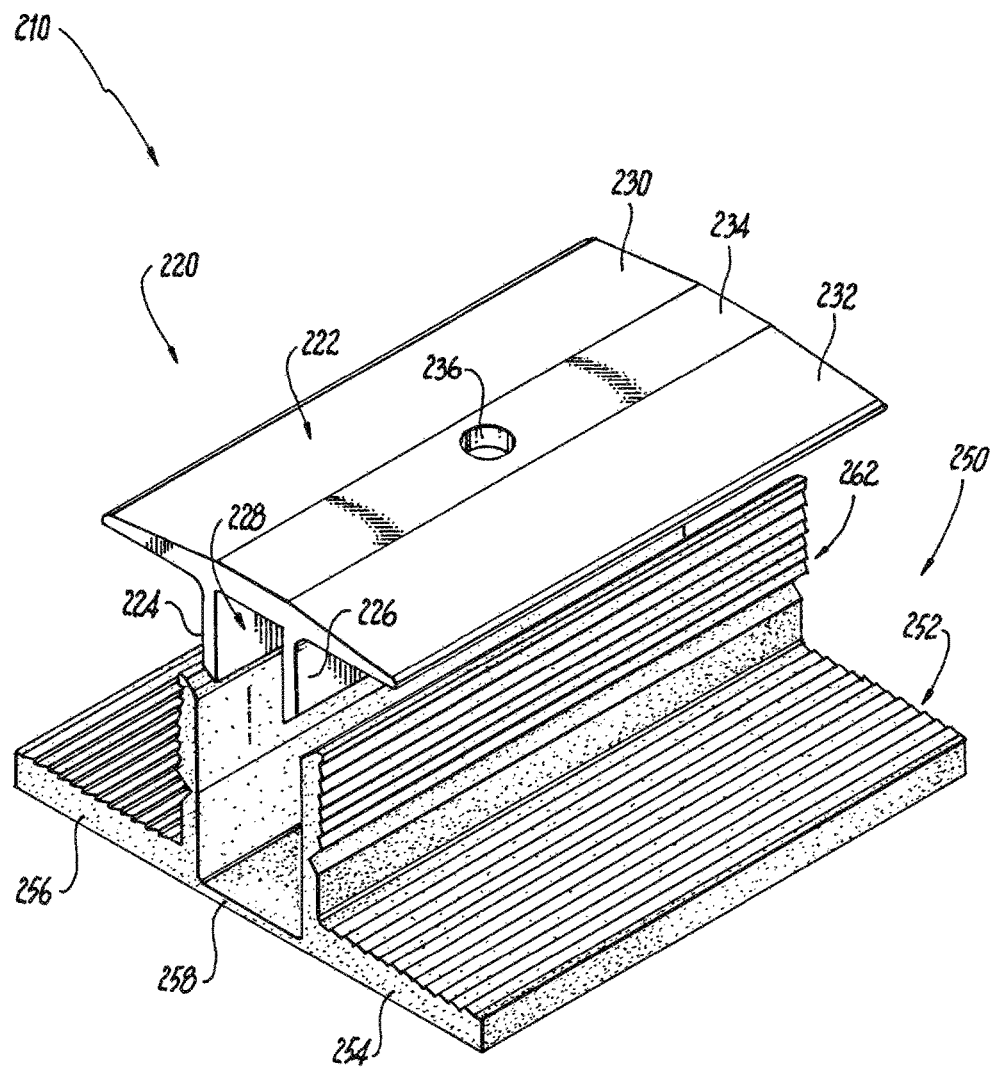
FIG. 30 is a top perspective view of another exemplary embodiment of a clamp according to the present disclosure, illustrating a clamp cover separated from a clamp grip.
Figure 31:
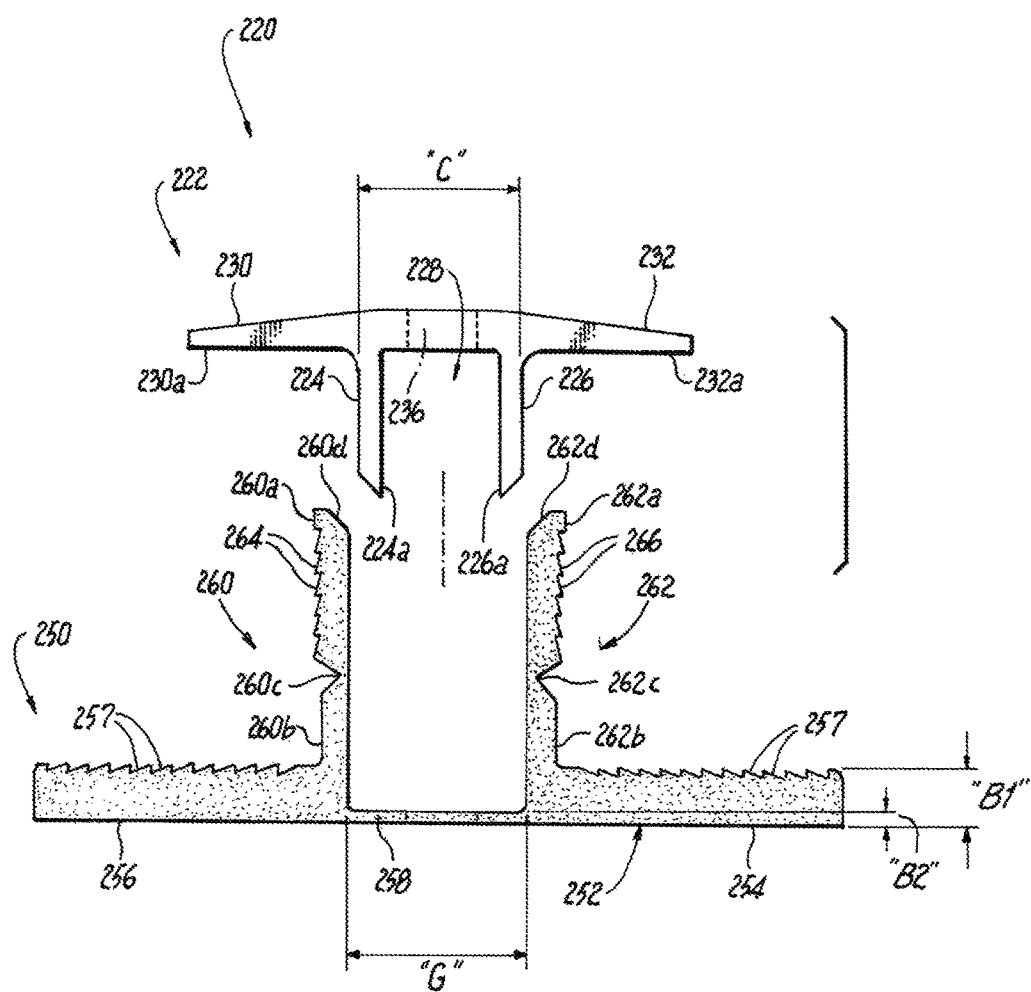
FIG. 31 is an end elevation view of the clamp of FIG. 30.
Figure 32:
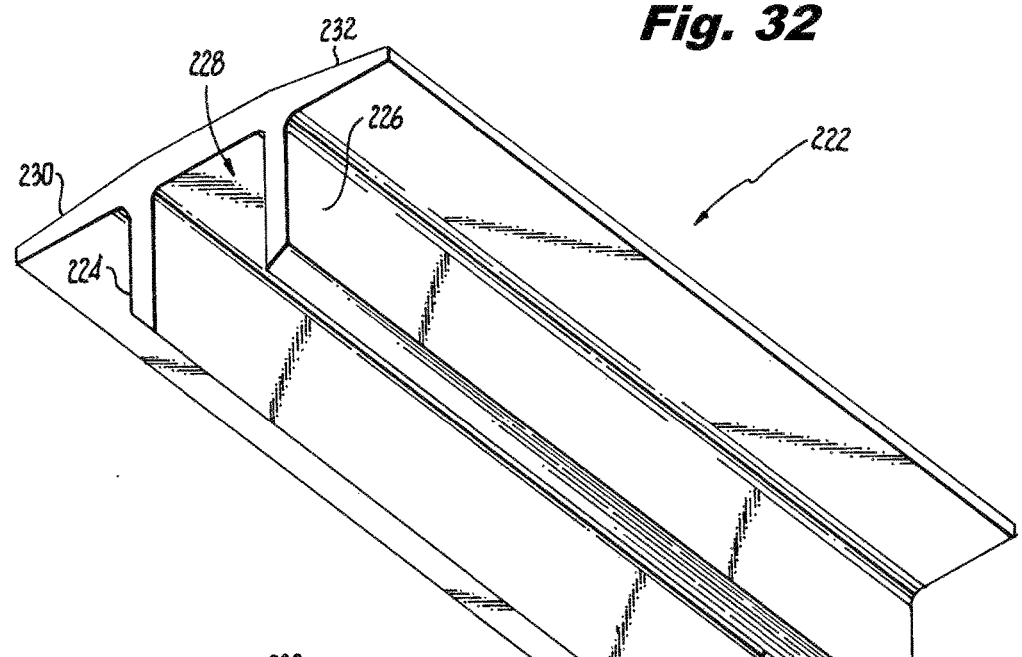
FIG. 32 is a bottom perspective view of the clamp cover of FIG. 30, illustrating a clamp leg extending from the clamp cover along the entire length of the clamp cover.

Referring to FIGS. 30-32, another exemplary embodiment of a clamp according to the present disclosure is shown. In this exemplary embodiment, the clamp 210 includes a clamp cover 220 and a clamp grip 250. The clamp cover 220 has a clamp arm 222 and a pair of side walls 224 and 226. The clamp arm 222 has a first clamp arm portion 230 extending generally from the first side wall 224 in a direction away from the channel 228 such that a module contacting surface 230a of the first clamp arm portion 230 is substantially perpendicular to the first side wall 224 Similarly, the clamp arm 222 has a second clamp arm portion 232 extending generally from the second side wall 226 in a direction away from the channel 228 such that a module contacting surface 232a of the second clamp arm portion 232 is substantially perpendicular to the second side wall 226. The clamp arm 222 has an intermediate portion 234 between the first clamp arm portion 230 and the second clamp arm portion 232. The intermediate portion is generally located between the side walls 224 and 226. The intermediate portion 234 includes a mounting aperture 236 used to secure the clamp 210 to a rail 12.

Figure 33:
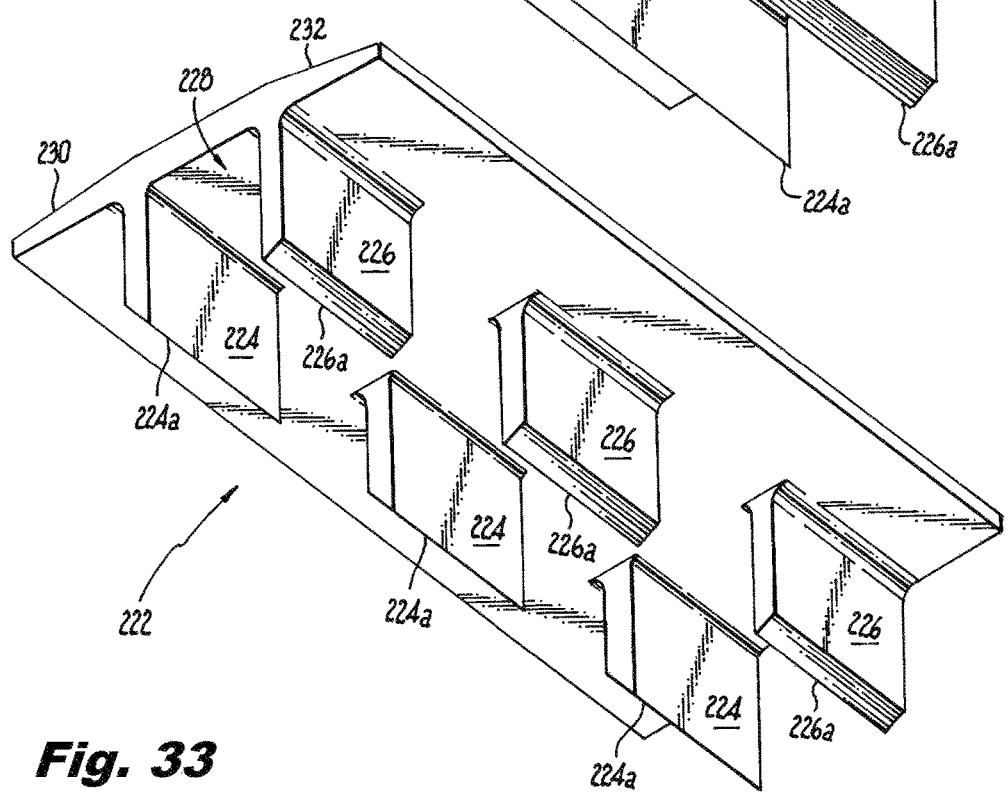
FIG. 33 is a bottom perspective view of another exemplary embodiment of the clamp cover of FIG. 30, illustrating multiple clamp legs extending from the clamp cover.

The first and second side walls 224 and 226 extend from and substantially perpendicular to the clamp arm 222, which forms a U-shaped channel 228. The distal end 224a and 226a of the side walls 224 and 226 are free ends. The distal ends 224a and 226a may terminate with various shapes. For example, the distal ends 224a and 226a may terminate with a tapered tip, as shown in FIG. 31, pointed tip, a flat tip or a rounded tip. Each side wall 224 and 226 may be a singular side wall extending the length of the clamp arm 222, as seen in FIG. 32, or the side walls 224 and 226 may be segmented walls that are spaced apart along the length of the clamp arm 222, as seen in FIG. 33.

The clamp arm 222 and side walls 224 and 226 of the clamp cover 220 may be made of a material that provides sufficient structural integrity to support a PV module. For example, materials such as stainless steel, aluminum and/or aluminum alloy may be used to fabricate the clamp arm 222 and side walls 224 and 226, which would also be suitable for instances where electrical bonding of the clamp 210 is needed since such materials are also electrically conductive. However, one skilled in the art would readily appreciate that the clamp arm 222 and side walls 224 and 226 of the clamp cover 220 may be made of non-conductive materials, such as composites, or other electrically conductive materials for instances.

It is noted that the clamp arm 222 and side walls 224 and 226 can be molded as a unitary component, or they can be constructed from multiple component parts secured together by for example welded joints.

Referring to FIGS. 30 and 31, the clamp grip 250 has base 252 comprising a first base member 254, a second base member 256 and a bridge 258 joining the first base member to the second base member. In an exemplary embodiment, the first base member 254 and second member 256 have a thickness of "B1" and the bridge has a thickness "B2" that is less the thickness 131. For example, the first base member 254 may have a thickness "B1" of about 3 mm to about 5 mm and the bridge may have a thickness "B2" of about 0.5 mm to about 1 mm.

Figure 35:
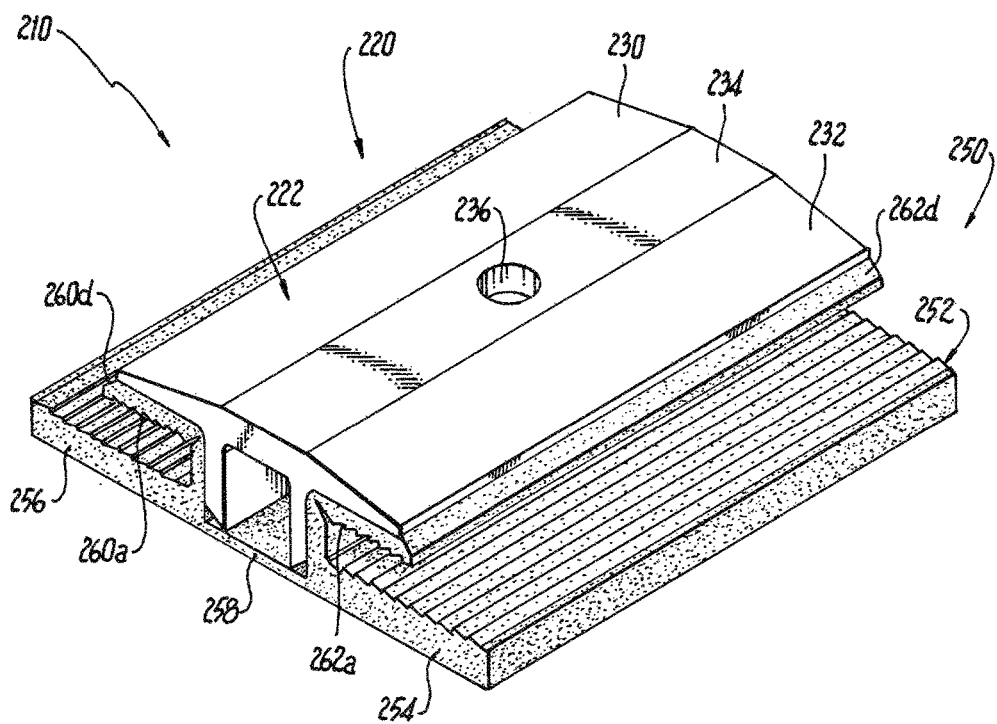
FIG. 35 is a top perspective view of the clamp of FIG. 30 illustrating the clamp cover engaged with the clamp grip.
Figure 36:
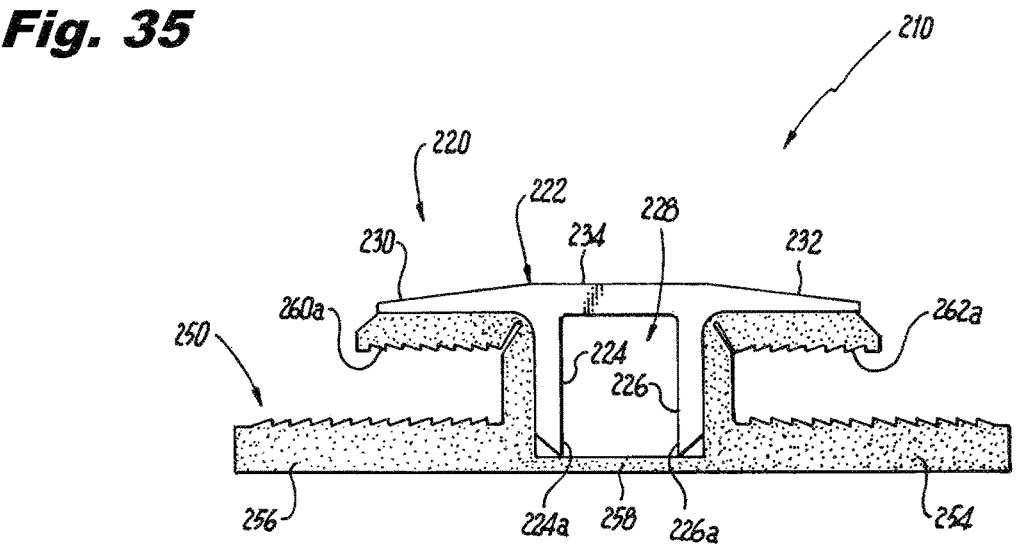
FIG. 36 is an end elevation view of the clamp of FIG. 35.

The clamp grip 250 also includes a pair of spaced apart side walls 260 and 262 extending from the base 250. The side walls 260 and 262 are spaced apart a distance "G" between the inside surfaces of the side walls 260 and 262, which is sufficient to permit the side walls 224 and 226 of the damp cover 220 to fit between the side walls 260 and 262. Side wall 260 has an upper wall 260a and a lower wall 260b separated by a notch 260c. Similarly, side wall 262 has an upper wall 262a and a lower wall 262b separated by a notch 262c. The notches 260c and 262c permit the upper wall of each side wall to bend about 90 degrees relative to the lower wall when pressure is applied to a caroming surface 260d and 262d of the upper side walls 260a and 262a, as shown in FIGS. 35 and 36. The damp grip 250 is made of a flexible, non-conductive material, such as rubber, to electrically isolate the side walls 224 and 226 from a PV module 14 positioned within the clamp 210 as described in more detail below.

Figure 34:
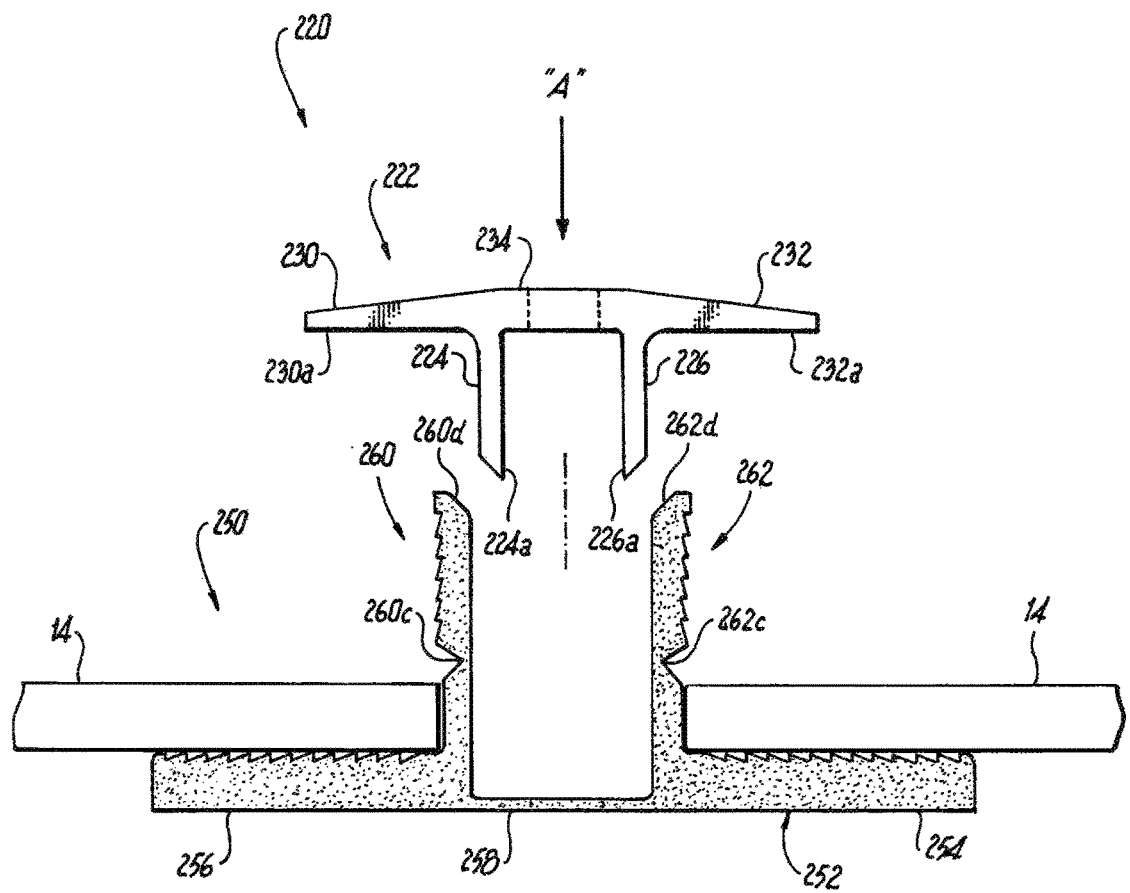
FIG. 34 is an end elevation view of the clamp of FIG. 30 illustrating the installation of PV modules.
Figure 37:
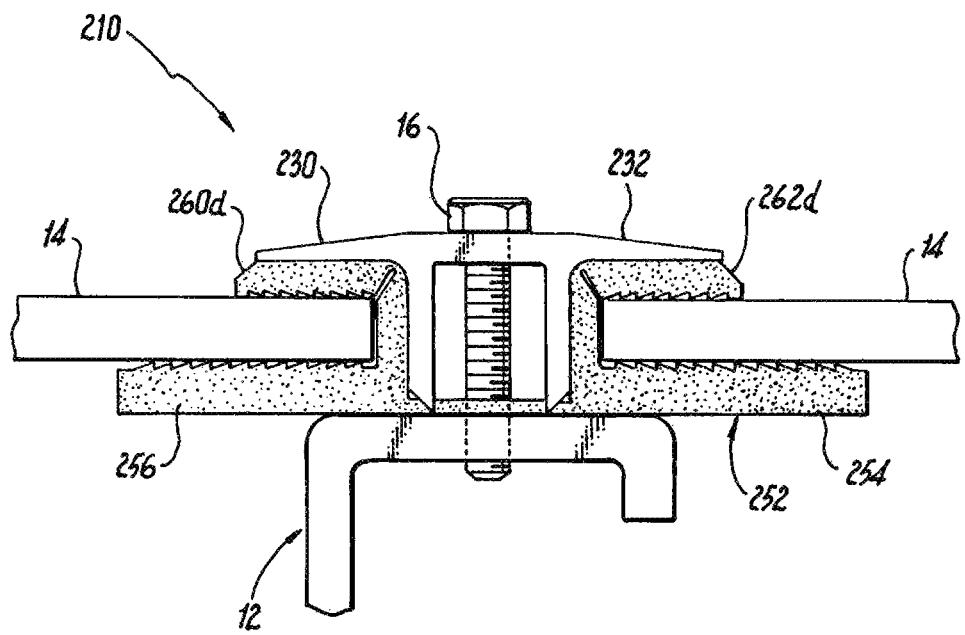
FIG. 37 is an end elevation view of the portion of the PV array of FIG. 29 illustrating a fastener securing the clamp to a rail.
Figure 38:
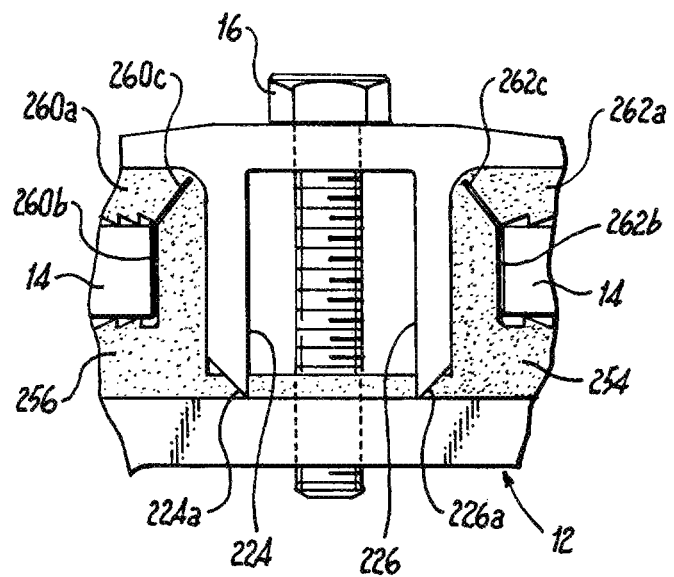
FIG. 38 is an enlarged view of a portion of the end elevation view of FIG. 37.

Referring again to FIGS. 34 and 36, to provide better gripping between the clamp grip 250 and a PV module 14 positioned within the clamp 210, an outer surface of the clamp grip may include ridges that further grip the PV module 14. More specifically, an outer surface of the first and second base members 254 and 256 may include ridges 257. Similarly, an outer surface of the upper wall 260a may include ridges 264, and an outer surface of the upper wall 262a may include ridges 266. When a PV module 14 is positioned within the clamp 210, the ridges further grip the PV module, Referring to FIGS. 34-38, a description of the assembly of a frameless PV module 14 into a clamp 210 will be described. Initially, a base 252 of a clamp grip 250 is rested on a rail 12 so that an aperture in the center of the bridge 258 of the base 252 is aligned with an aperture in the rail. As seen in FIG. 34, one frameless PV module 14 is positioned to rest on the first base member 254 of the base 252, and another frameless PV module 14 is positioned to rest on the second base member 256 of the base 252. The clamp cover 220 is then moved toward the clamp grip 250, in the direction of arrow "A", so that the module contacting surface 230a of the clamp arm portion 230 engages the cam surface 260d of upper wall 260a, and so that the module contacting surface 232a of the clamp arm portion 232 engages the cam surface 262d of upper wall 262a. Continued downward movement of the clamp cover 220 towards the clamp grip 250 causes the upper walls 260a and 262a to bend along the notches 260c and 262c in a direction away from the channel 228 and towards the PV module 14, as seen in FIGS. 35 and 36, forming a pocket. With the side walls 224 and 226 of the clamp cover 220 positioned between the walls 260 and 262 of the clamp grip 250, a fastener 16 (e.g., bolt and nut) can be inserted through the aperture 236 in the intermediate portion 234 of the clamp arm 222 through the aperture in the bridge 258 of the base 252 and through the threaded aperture in the rail 12 and tightened, as seen in FIGS. 37 and 38. As the fastener 16 is tightened to a point where the distal ends 224a and 226a of side walls 224 and 226, respectively, cut or pass through the bridge 258 in the clamp grip 250 to engage the top surface of the rail. The distal ends of the side walls 224 and 226 engaging the rail act as a stop to prevent further tightening of the clamp 210 to the rail 12 so as not to over tighten the clamp 210 around the frameless PV module. When tightened, the distal ends 224a and 226a of the side walls may also cut through any non-conductive coatings, e.g., oxide, paint and/or anodization, on the rail 12 to contact the conductive metal of the rail to create a conductive path between the rail and clamp cover 220 to facilitate bonding the clamp cover to the rail.

While illustrative embodiment s of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A clamp comprising:
a clamp cover having a base, first and second side walls extending from the base and forming a channel, a first clamp arm extending from the first side wall, and a second clamp arm extending from the second side wall; and
a clamp grip having base and first and second side walls extending from the base forming a channel to receive the clamp cover channel, wherein the first side wall includes an upper wall, a lower wall and a notch between the upper and lower walls, the notch defining a bending point for the first side wall, and wherein the second side wall includes an upper wall, a lower wall and a notch between the upper and lower walls, the notch defining a bending point for the second side wall;
wherein when the clamp cover channel is inserted into the clamp grip channel the first clamp arm engages the upper wall of the first side wall of the clamp grip such that the upper wall of the first side wall of the clamp grip bends at the bending point away from the clamp grip channel to form a pocket to receive at least a portion of a frameless PV module, and
wherein when the clamp cover channel is inserted into the clamp grip channel the second clamp arm engages the upper wall of the second side wall of the clamp grip such that the upper wall of the second side wall of the clamp grip bends at the bending point away from the clamp grip channel to form a pocket to receive at least a portion of a frameless PV module.

2. The clamp according to claim 1, wherein the clamp cover base includes at least one leg extending from a bottom surface of the clamp cover base, and wherein the at least one leg pierces the clamp grip base when the clamp cover channel is inserted into the clamp grip channel and the clamp cover and the clamp grip are secured to a rail.

3. The clamp according to claim 2, wherein the at least one leg pierces the rail when the clamp cover channel is inserted into the clamp grip channel and the clamp cover and the clamp grip are secured to the rail to form an electrically conductive path between the rail and the clamp.

4. The clamp according to claim 1, wherein the clamp cover is made of an electrically conductive material.

5. The clamp according to claim 4, wherein the electrically conductive material comprises stainless steel, aluminum and aluminum alloy.

6. The clamp according to claim 1, wherein the clamp grip is made of a non-conductive material.

7. The clamp according to claim 6, wherein the non-conductive material comprises rubber.

8. The clamp according to claim 1, wherein the clamp cover base has an aperture for receiving a mounting fastener and the clamp grip base has an aperture for receiving the mounting fastener, and wherein the clamp grip base aperture is aligned with the clamp cover base aperture.

9. The clamp according to claim 1, wherein the clamp cover base includes at least one bonding member extending from a bottom surface of the clamp cover base.

10. The clamp according to claim 9, wherein the at least one bonding member comprises a volcano.

11. The clamp according to claim 9, wherein the at least one bonding member comprises a serrated volcano.

12. A clamp comprising:
a clamp cover having a base, first and second side walls extending from the base and forming a channel, a first clamp arm extending from the first side wall, and a second clamp arm extending from the second side wall, wherein the base includes at least one leg extending from an end of the base; and
a clamp grip having base and first and second side walls extending from the base forming a channel to receive the clamp cover channel, wherein the first side wall includes an upper wall, a lower wall and a notch between the upper and lower walls, the notch defining a bending point for the first side wall, and wherein the second side wall includes an upper wall, a lower wall and a notch between the upper and lower walls, the notch defining a bending point for the second side wall;
wherein when the clamp cover channel is inserted into the clamp grip channel the first clamp arm engages the upper wall of the first side wall of the clamp grip such that the upper wall of the first side wall of the clamp grip bends at the bending point away from the clamp grip channel to form a pocket to receive at least a portion of a frameless PV module, and
wherein when the clamp cover channel is inserted into the clamp grip channel the second clamp arm engages the upper wall of the second side wall of the clamp grip, such that the upper wall of the second side wall of the clamp grip bends at the bending point away from the clamp grip channel to form a pocket to receive at least a portion of a frameless PV module.

13. The clamp according to claim 12, wherein the at least one leg extending from an end of the clamp cover base comprises a first leg extending from a first end of the clamp cover base and a second leg extending from a second end of the clamp cover base.

14. The clamp according to claim 12, wherein the clamp cover is made of an electrically conductive material.

15. The clamp according to claim 14, wherein the electrically conductive material comprises stainless steel, aluminum and aluminum alloy.

16. The clamp according to claim 12, wherein the clamp grip is made of a non-conductive material.

17. The clamp according to claim 16, wherein the non-conductive material comprises rubber.

18. The clamp according to claim 12, wherein the clamp cover base has an aperture for receiving a mounting fastener and the clamp grip base has an aperture for receiving the mounting fastener, and wherein the clamp grip base aperture is aligned with the clamp cover base aperture.

19. The clamp according to claim 12, wherein the clamp cover base includes at least one bonding member extending from a bottom surface of the clamp cover base.

20. The clamp according to claim 19, wherein the at least one bonding member comprises a volcano.

21. The clamp according to claim 19, wherein the at least one bonding member comprises a serrated volcano.

22. A clamp comprising:
a clamp cover having a clamp arm and first and second side walls extending from the clamp arm, the clamp arm having a first clamp arm portion and a second clamp arm portion; and
a clamp grip having base and first and second side walls extending from the base forming a channel to receive the first and second clamp cover side walls, wherein the first clamp grip side wall includes an upper wall, a lower wall and a notch between the upper and lower walls, the notch defining a bending point for the first clamp grip side wall, and wherein the second clamp grip side wall includes an upper wall, a lower wall and a notch between the upper and lower walls, the notch defining a bending point for the second clamp grip side wall;

wherein when the clamp cover side walls are inserted into the clamp grip channel the first clamp arm portion engages the upper wall of the first clamp grip side wall such that the upper wall of the first clamp grip side wall bends at the bending point away from the clamp grip channel to form a pocket to receive at least a portion of a frameless PV module, and wherein when the clamp cover side walls are inserted into the clamp grip channel the second clamp arm portion engages the upper wall of the second clamp grip side wall such that the upper wall of the second clamp grip side wall bends at the bending point away from the clamp grip channel to form a pocket to receive at least a portion of a frameless PV module.

23. The clamp according to claim 22, wherein a distal end of the first clamp cover side wall pierces the clamp grip base when the first clamp cover side wall is inserted into the clamp grip channel and the clamp cover and the clamp grip are tightened to a rail, and wherein a distal end of the second clamp cover side wall pierces the clamp grip base when the second clamp cover side wall is inserted into the clamp grip channel and the clamp cover and the clamp grip are tightened to the rail.

24. The clamp according to claim 23, wherein when the distal end of the first clamp cover side wall pierces the clamp grip base, the distal end of the first clamp cover side wall pierces non-conductive coatings on the rail when the clamp cover and the clamp grip are further tightened to the rail, and wherein when the distal end of the second clamp cover side wall pierces the clamp grip base, the distal end of the second clamp cover side wall pierces non-conductive coatings on the rail when the clamp cover and the clamp grip are further tightened to the rail.

25. The clamp according to claim 22, wherein the clamp cover is made of an electrically conductive material.

26. The clamp according to claim 25, wherein the electrically conductive material comprises stainless steel, aluminum and aluminum alloy.

27. The clamp according to claim 22, wherein the clamp grip is made of a non-conductive material.

28. The clamp according to claim 27, wherein the non-conductive material comprises rubber.

29. The clamp according to claim 22, wherein the clamp cover arm has an aperture for receiving a mounting fastener and the clamp grip base has an aperture for receiving the mounting fastener, and wherein the clamp grip base aperture is aligned with the clamp cover arm aperture.

30. The clamp according to claim 22, wherein a distal end of the first clamp cover side wall comprises a tapered end, a pointed end, a rounded end or a flat end.

31. The clamp according to claim 22, wherein a distal end of the second clamp cover side wall comprises a tapered end, a pointed end, a rounded end or a flat end.

* * * * *